United States Patent [19]
Kakutani

[11] Patent Number: 6,089,691
[45] Date of Patent: Jul. 18, 2000

[54] PRINTING SYSTEM AND METHOD OF RECORDING IMAGES

[75] Inventor: Toshiaki Kakutani, Suwa, Japan

[73] Assignee: Seiko Epson Corporation, Tokyo, Japan

[21] Appl. No.: 08/896,536

[22] Filed: Jul. 18, 1997

[30] Foreign Application Priority Data

Jul. 18, 1996 [JP] Japan .................................. 8-209232
Jun. 6, 1997 [JP] Japan .................................. 9-165128

[51] Int. Cl.$^7$ ...................................................... B41J 2/205
[52] U.S. Cl. .............................................. 347/15; 347/43
[58] Field of Search .............................. 347/5, 9, 15, 40, 347/41, 43

[56] References Cited

U.S. PATENT DOCUMENTS

| | | |
|---|---|---|
| 4,516,139 | 5/1985 | Takiguchi . |
| 4,595,948 | 6/1986 | Itoh et al. . |
| 4,672,432 | 6/1987 | Sakurada et al. . |
| 4,772,911 | 9/1988 | Sasaki et al. . |
| 4,855,753 | 8/1989 | Ichikawa et al. . |
| 4,860,026 | 8/1989 | Matsumoto et al. . |
| 5,615,021 | 3/1997 | Lin . |
| 5,917,510 | 6/1999 | Narushima et al. ..................... 347/15 |

*Primary Examiner*—Sandra Brase
*Attorney, Agent, or Firm*—Oblon, Spivak, McClelland, Maier & Neustadt, P.C.

[57] ABSTRACT

The present invention appropriately determines the on/off state of dots having different hues in a printer using at least two inks of different hues, thereby enhancing the quality of printing. The system of the present invention applies the systematic dither method to determine whether or not dots are to be formed by ink of a predetermined hue, for example, magenta. In the case of formation of dots by magenta ink, the system drives a piezoelectric element PE disposed on a head corresponding to the magenta ink to form magenta dots and calculates a resulting value MRST. In the case of non-formation of dots by the magenta ink, on the other hand, the resulting value MRST is set equal to zero. The system then applies the technique of error diffusion to determine whether or not dots are to be formed by cyan ink, based on the tone data of the cyan ink. The structure of the present invention enables a difference between density data M(x,y) of the magenta ink and its resulting value MRST to affect density data of the cyan ink. This makes it difficult to form dots of cyan ink in the vicinity of dots of magenta ink.

39 Claims, 25 Drawing Sheets

Fig. 9

INK COMPOSITIONS AND PROPERTIES

| | | C1 | C2 | M1 | M2 | Y | Bk |
|---|---|---|---|---|---|---|---|
| DYES | Directblue199 | 3.6 | 0.9 | | | | |
| | Acidred289 | | | 2.8 | 0.7 | | |
| | Directyellow86 | | | | | 1.8 | |
| | Foodblack2 | | | | | | 4.8 |
| DIETHYLENE GLYCOL | | 30 | 35 | 20 | 25 | 30 | 25 |
| SURFINOL 465 | | 1 | 1 | 1 | 1 | 1 | 1 |
| WATER | | 65.4 | 63.1 | 76.2 | 73.3 | 67.2 | 69.2 |
| VISCOSITY (mPa·s) | | 3.0 | 3.0 | 3.0 | 3.0 | 3.0 | 3.0 |

PRINTING SYSTEM AND METHOD OF RECORDING IMAGES

BACKGROUND OF THE INVENTION

1. Field of the Invention

The present invention relates to a printing system with a head that can create at least two different types of dots having different hues on an object, so as to record a multi-tone image through a distribution of the dots, as well as to a method of recording images with such a printing system.

2. Description of the Related Art

Color printers, in which a plurality of color inks are discharged from a head, are widely used as an output device of a computer that records multi-color, multi-tone images processed by the computer. There are several techniques available for creating multi-tone images in the process of printing multi-color images with three color inks, cyan, magenta, and yellow (CMY). One available technique, which is adopted in the conventional printers, expresses the tone of a printed image by the density of dots (the frequency of appearance of dots per unit of area) while fixing the size of dots formed on a sheet of paper by a stream of ink droplets. Another available technique adjusts the diameter of dots formed on a sheet of paper, in order to vary the density of dots per unit of area. The advanced fine working of the head for creating ink particles has improved the density of dots formable per predetermined length or the variable range of dot diameters. The improvement in such printers has, however, so far been limited to 300 dpi through 720 dpi in printing density or resolution and several tens microns in particle diameter. This is significantly lower than the level of expression or resolution of silver photography, which has reached several thousands dpi on the film.

Dots are sparsely formed in an area of low image density, that is, in an area of low density of dots to be printed. This increases the degree of granularity and makes the dots undesirably conspicuous. The proposed technique regards the multi-valued process, for example, half-toning process in printers, in order to equalize the frequency of appearance of the respective color dots in the area of low printing density.

Even in the system for equalizing the frequency of appearance of the respective color dots, dots of plural color inks are independently subjected to multi-valued coding and formed in the process of multi-color printing. In some cases, this causes uneven distribution of cyan dots and magenta dots, thereby making the granularity undesirably conspicuous.

SUMMARY OF THE INVENTION

The object of the present invention is to appropriately carry out multi-valued coding of at least two types of dots having different hues (for example, dots formed by three primary color inks of cyan, magenta, and yellow) based on tone signals of an original image, thereby improving the quality of a resulting recorded image.

At least part of the above and the other related objects is realized by a first printing system, which has a head for forming at least two types of dots having different hues on an object and records a multi-tone image through a distribution of the dots. The first printing system of the present invention includes: input means for successively inputting multi-color tone signals regarding pixels included in an image to be printed; first dot formation determination means for carrying out multi-valued coding with respect to one type of dots selected among the at least two types of dots having different hues, based on the input tone signal of a color corresponding to the one type of dots, and determining either one of formation and non-formation of the one type of dots; second dot formation determination means for enabling the result of multi-valued coding carried out by the first dot formation determination means to affect a recording density to be realized by another type of dots having a different hue, carrying out multi-valued coding with respect to the another type of dots according to the recording density, and determining either one of formation and non-formation of the another type of dots; and head drive means for driving the head based on the results of determination by the first dot formation determination means and the second dot formation determination means, thereby actually forming the at least two types of dots having different hues.

A first image recording method corresponding to the first printing system controls a head that is able to form at least two types of dots having different hues on an object and records a multi-tone image through a distribution of the dots. The first method includes the steps of:

(a) successively inputting multi-color tone signals regarding pixels included in an image to be printed;

(b) carrying out multi-valued coding with respect to one type of dots selected among the at least two types of dots having different hues, based on the input tone signal of a color corresponding to the one type of dots, and determining either one of formation and non-formation of the one type of dots;

(c) enabling the result of multi-valued coding carried out in the step (b) to affect a recording density to be realized by another type of dots having a different hue, carrying out multi-valued coding with respect to the another type of dots according to the recording density, and determining either one of formation and non-formation of the another type of dots; and (d) driving the head based on the results of determination in the step (b) and in the step (c), thereby actually forming the at least two types of dots having different hues.

In the first printing system of the present invention, the first dot formation determination means carries out binary coding, ternary coding, or another multi-valued coding with respect to one type of dots selected among at least two types of dots having different hues, and determines formation or non-formation of the one type of dots. The second dot formation determination means enables the result of multi-valued coding carried out by the first dot formation determination means to reflect the recording density to be realized by another type of dots having a different hue. The second dot formation determination means carries out multi-valued coding with respect to the another type of dots having a different hue according to the reflected recording density, and determines formation or non-formation of the another type of dots. The head drive means drives the head based on the results of determination by the first dot formation determination means and the second dot formation determination means, thereby actually forming the at least two types of dots having different hues.

The first image recording method of the present invention carries out multi-valued coding with respect to one type of dots selected among at least two types of dots having different hues, and determines formation or non-formation of the one type of dots. The method then enables the result of multi-valued coding to reflect the recording density to be realized by another type of dots having a different hue, carries out multi-valued coding with respect to the another type of dots having a different hue according to the reflected recording density, and determines formation or non-formation of the another type of dots. The method subsequently drives the head based on the results of determination, thereby actually forming the at least two types of dots having different hues.

In the first printing system of the present invention and the corresponding first image recording method, determination of formation or non-formation of one type of dots affects determination of formation or non-formation of another type of dots having a different hue. Namely the system and the corresponding method according to the present invention determine the existence or non-existence of at least two types of dots having different hues in correlation to each other, in order to express tones of an original image.

The present invention is also directed to a recording medium, on which a first program for realizing the above image recording method on a computer is recorded. The first program is readable by the computer that is connected to a printing system with a head for forming at least two types of dots having different hues on a printing object, and records a multi-tone image through a distribution of the dots. The first program enables the computer to realize: a function of successively inputting multi-color tone signals regarding pixels included in an image to be printed; a function of carrying out multi-valued coding with respect to one type of dots selected among the at least two types of dots having different hues, based on the input tone signal of a color corresponding to the one type of dots, and determining either one of formation and non-formation of the one type of dots; a function of enabling the result of multi-valued coding with respect to the one type of dots to affect a recording density to be realized by another type of dots having a different hue, carrying out multi-valued coding with respect to the another type of dots according to the recording density, and determining either one of formation and non-formation of the another type of dots; and a function of driving the head based on the results of determination with respect to both the one type of dots and the another type of dots, thereby actually forming the at least two types of dots having different hues.

The first program recorded on the recording medium is read and executed by the computer. The computer executes the first program, determines formation or non-formation of dots, and drives the head mounted on the printing system, thus realizing the above image recording method.

In the first printing system and the corresponding image recording method, the one type of dots selected among at least two types of dots having different hues and processed first may be dots of a color having a greater visual effect. The color having a greater visual effect has lower lightness in prints. In accordance with one possible application, one type of dots among at least two types of dots having different hues are of a color included in three primary colors that can express a full color, for example, one color selected among cyan, magenta, and yellow, or one color selected among red, green, and blue, whereas another type of dots having a different hue are of another color included in the three primary colors.

In accordance with another possible application, one type of dots are of a color selected among three primary colors that can express a full color, for example, one color selected among cyan, magenta, and yellow, whereas another type of dots having a different hue are of a color containing the selected one color component and a different color component, for example, black dots.

Any available technique is adopted to correlate the determination of formation or non-formation of one type of dots with the determination of formation or non-formation of another type of dots. For example, one available technique determines formation or non-formation of one type of dots based on the input tone signal regarding the one type of dots, prior to determination of formation or non-formation of another type of dots having a different hue. Only when non-formation of one type of dots is determined, the determination of formation or non-formation is carried out for another type of dots having a different hue.

Another available technique determines non-formation of another type of dots, in case that formation of one type of dots is determined. This technique does not form another type of dots, as long as one type of dots are formed. This simplifies the determination.

In accordance with one preferable structure, a difference between a first printing density, which corresponds to the input tone signal relating to the another type of dots and regarding a target pixel, and a second printing density, which is realized by the another type of dots in the target pixel, is calculated as a density error, based on the determination of formation or non-formation of the another type of dots by the second dot formation determination means. The density error is distributed into peripheral pixels that are in proximity to the target pixel, in order to enable the density error to affect the determination of formation or non-formation of the another type of dots with respect to the peripheral pixels. This structure can favorably reduce the quantization error of the whole image.

In case that the first dot formation determination means determines formation of one type of dots among at least two dots having different hues, the density error or the difference between the first printing density corresponding to the input tone signal relating to the another type of dots and the second printing density realized by the another type of dots may be calculated as a value representing a degree of correlation of hues between the one type of dots and the another type of dots. By way of example, it is assumed that the one type of dots processed first are black in hue and the another type of dots are cyan or magenta in hue. In this case, formation of black dots results in considering cyan dots or magenta dots to be also formed. In general, when both types of dots have a high degree of correlation in hue, the density error is calculated on the assumption that formation of one type of dots automatically leads to formation of another type of dots. When both types of dots have a low degree of correlation in hue, for example, as shown in the combination of cyan and yellow, however, the density error is calculated on the assumption of little effect of formation of one type of dots upon formation of another type of dots.

Part of the above and the other related objects may be realized by a second printing system, which has a head for forming at least two types of dots having different hues on an object, and records a multi-tone image through a distribution of the dots. The second printing system of the present invention includes: input means for successively inputting multi-color tone signals regarding pixels included in an image to be printed; first dot formation determination means for carrying out multi-valued coding with respect to one type of dots selected among the at least two types of dots having different hues, based on the input tone signal of a color corresponding to the one type of dots, and determining either one of formation and non-formation of the one type of dots; local error calculation means for calculating a local difference between a first printing density, which corresponds to the input tone signal relating to the one type of dots and regarding a target pixel, and a second printing density, which is realized by the one type of dots in the target pixel, based on the result of multi-valued coding carried out by the first dot formation determination means; second dot formation determination means for enabling the local difference to affect a recording density to be realized by another type of dots having a different hue, carrying out multi-valued coding with respect to the another type of dots according to the recording density, and determining either one of formation and non-formation of the another type of dots; and head drive means for driving the head based on the results of determination by the first dot formation determination means and the second dot formation determination means, thereby actually forming the at least two types of dots having different hues.

A second image recording method corresponding to the second printing system controls a head, which is able to form at least two types of dots having different hues on an object, and records a multi-tone image through a distribution of the dots. The second method includes the steps of:

(a) successively inputting multi-color tone signals regarding pixels included in an image to be printed;

(b) carrying out multi-valued coding with respect to one type of dots selected among the at least two types of dots having different hues, based on the input tone signal of a color corresponding to the one type of dots, and determining either one of formation and non-formation of the one type of dots;

(c) calculating a local difference between a first printing density, which corresponds to the input tone signal relating to the one type of dots and regarding a target pixel, and a second printing density, which is realized by the one type of dots in the target pixel, based on the result of multi-valued coding carried out in the step (b);

(d) enabling the local difference to affect a recording density to be realized by another type of dots having a different hue, carrying out multi-valued coding with respect to the another type of dots according to the recording density, and determining either one of formation and non-formation of the another type of dots; and (e) driving the head based on the results of determination in the step (b) and the step (d), thereby actually forming the at least two types of dots having different hues.

The second printing system and the corresponding image recording method carry out multi-valued coding with respect to one type of dots based on the input multi-color tone signals of the image, and calculate a local difference between a first printing density, which corresponds to the input tone signal relating to the one type of dots and regarding a target pixel, and a second printing density, which is realized by the one type of dots in the target pixel, based on the result of multi-valued coding. The printing system and the corresponding method then enable the local different to affect a recording density to be realized by another type of dots having a different hue, carry out multi-valued coding with respect to the another type of dots according to the recording density, and determine formation or non-formation of the another type of dots. The head is subsequently driven based on the results of determination with respect to the one type of dots and the another type of dots, in order to actually form the at least two types of dots having different hues.

The density difference locally occurring due to formation of one type of dots reflects formation of another type of dots. This structure accordingly cancels the uneven appearance of the at least two type of dots.

The present invention is also directed to a recording medium, on which a second program for realizing the above image recording method on a computer is recorded. The second program is readable by the computer that is connected to a printing system with a head for forming at least two types of dots having different hues on a printing object, and records a multi-tone image through a distribution of the dots. The second program enables the computer to realize: a function of successively inputting multi-color tone signals regarding pixels included in an image to be printed; a function of carrying out multi-valued coding with respect to one type of dots selected among the at least two types of dots having different hues, based on the input tone signal of a color corresponding to the one type of dots, and determining either one of formation and non-formation of the one type of dots; a function of calculating a local difference between a first printing density, which corresponds to the input tone signal relating to the one type of dots and regarding a target pixel, and a second printing density, which is realized by the one type of dots in the target pixel, based on the result of multi-valued coding with respect to the one type of dots; a function of enabling the local difference to affect a recording density to be realized by another type of dots having a different hue, carrying out multi-valued coding with respect to the another type of dots according to the recording density, and determining either one of formation and non-formation of the another type of dots; and a function of driving the head based on the results of determination with respect to both the one type of dots and the another type of dots, thereby actually forming the at least two types of dots having different hues.

The second program recorded on the recording medium is read and executed by the computer. The computer executes the second program, determines formation or non-formation of dots, and drives the head mounted on the printing system, thus realizing the above image recording method.

In the second printing system and the corresponding image recording method, the one type of dots selected among at least two types of dots having different hues and processed first may be dots of a color having a greater visual effect. The color having a greater visual effect has lower lightness in prints. In this structure, after the multi-valued coding with respect to the first dots of a hue having a greater visual effect, the second dots of a different hue are subjected to multi-valued coding, in order to cancel the local difference regarding the first dots. This method favorably reduces the degree of granularity due to the multi-valued coding.

In this structure, the local difference may be obtained directly as the difference between a first printing density, which corresponds to the input tone signal relating to the one type of dots and regarding a target pixel, and a second printing density, which is actually realized by the on/off state of the one type of dots in the target pixel, or as the product of the difference and a predetermined coefficient of correction. Another possible structure calculates a degree of effect of the first printing density, which corresponds to the input tone signal relating to the one type of dots and regarding the target pixel, upon a printing density by the another type of dots having a different hue (hereinafter referred to as the first degree of effect), as well as a degree of effect of the second printing density, which is realized by the one type of dots in the target pixel, upon the printing density by the another type of dots having a different hue (hereinafter referred to as the second degree of effect). This structure also calculates a degree of effect of a density error upon the printing density by the another type of dots having a different hue (hereinafter referred to as the third degree of effect), based on the determination of formation or non-formation of the another type of dots with respect to peripheral pixels that are in proximity to the target pixel. Here the density error represents a difference between a printing density corresponding to the input tone signals relating to the another type of dots and regarding the peripheral pixels and a printing density realized by the another type of dots in the peripheral pixels. The local difference is then calculated by taking into account the first degree of effect, the second degree of effect, and the third degree. In this structure, one possible method directly calculates the difference between the first degree of effect and the second degree of effect. Another possible method carries out correction independently for the first degree of effect and the second degree of effect. Still another possible method carries out correction with respect to the first degree of effect the third degree of effect, and the second degree of effect in this sequence. These methods enable correction as the local error. Correction based on the first through the third degrees of effect may be carried out in any desired sequence.

In accordance with one possible application, one type of dots among at least two types of dots having different hues are of a color included in three primary colors that can express a full color, for example, one color selected among cyan, magenta, and yellow, or one color selected among red, green, and blue, whereas another type of dots having a different hue are of another color included in the three primary colors.

In accordance with another possible application, one type of dots are of a color selected among three primary colors that can express a full color, for example, one color selected among cyan, magenta, and yellow, whereas another type of dots having a different hue are of a color containing the selected one color component and a different color component, for example, black dots.

In accordance with one preferable structure, a difference between a first printing density, which corresponds to the input tone signal relating to the another type of dots and regarding a target pixel, and a second printing density, which is realized by the another type of dots in the target pixel, is calculated as a density error, based on the determination of formation or non-formation of the another type of dots. The density error is distributed into peripheral pixels that are in proximity to the target pixel, in order to enable the density error to affect the determination of formation or non-formation of the another type of dots with respect to the peripheral pixels. This structure can favorably reduce the quantization error of the whole image.

In the first printing system and the second printing system, the head may be able to discharge at least two types of inks having different densities, with respect to at least two color inks having different hues. In this case, at least two types of dots having different densities per unit of area and formed by the at least two types of inks having different densities. In accordance with one preferable application, at least two types of inks having different densities include a higher-density ink and a lower-density ink, and a dye density of the lower-density ink is approximately one quarter a dye density of the higher-density ink.

Part of the above and the other related objects may be realized by a third printing system, which has a head for forming at least two types of chromatic color dots of different hues by at least two chromatic color inks as well as achromatic color dots by an achromatic color ink on an object, and records a multi-tone image through a distribution of the dots. The third printing system of the present invention includes: input means for successively inputting tone signals regarding pixels included in an image to be printed; density calculation means for calculating densities by the at least two chromatic color inks and a density by the achromatic color ink, based on the input tone signals; achromatic color dot formation determination means for carrying out multi-valued coding with respect to the achromatic color ink based on the density by the achromatic color ink calculated by the density calculation means, and determining either one of formation and non-formation of achromatic color dots by the achromatic color ink; density correction means for obtaining correction data, which are to reflect the densities by the at least two chromatic color inks, based on the result of multi-valued coding with respect to the achromatic color ink, and correcting the densities by the at least two chromatic color inks; chromatic color dot formation determination means for carrying out multi-valued coding with respect to the at least two chromatic color dots of different hues, based on the corrected densities by the at least two chromatic color inks, and determining either one of formation and non-formation of the at least two chromatic color dots of different hues; and head drive means for driving the head based on the results of determination by the achromatic color dot formation determination means and the chromatic color dot formation determination means, thereby actually forming the at least two chromatic color dots of different hues by the at least two chromatic color inks as well as the achromatic color dots by the achromatic color ink.

A third image recording method corresponding to the third printing system controls a head, which is able to form at least two types of chromatic color dots of different hues by at least two chromatic color inks as well as achromatic color dots by an achromatic color ink on an object, and records a multi-tone image through a distribution of the dots. The third method includes the steps of:

(a) successively inputting tone signals regarding pixels included in an image to be printed;

(b) calculating densities by the at least two chromatic color inks and a density by the achromatic color ink, based on the input tone signals;

(c) carrying out multi-valued coding with respect to the achromatic color ink based on the density by the achromatic color ink calculated in the step (b), and determining either one of formation and non-formation of achromatic color dots by the achromatic color ink;

(d) obtaining correction data, which are to reflect the densities by the at least two chromatic color inks, based on the result of multi-valued coding with respect to the achromatic color ink, and correcting the densities by the at least two chromatic color inks;

(e) carrying out multi-valued coding with respect to the at least two chromatic color dots of different hues, based on the corrected densities by the at least two chromatic color inks, and determining either one of formation and non-formation of the at least two chromatic color dots of different hues; and (f) driving the head based on the results of determination in the step (c) and the step (e), thereby actually forming the at least two chromatic color dots of different hues by the at least two chromatic color inks as well as the achromatic color dots by the achromatic color ink.

The third printing system and the corresponding image recording method calculate densities by the at least two chromatic color inks and a density by the achromatic color ink, based on the input tone signals successively input for the respective pixels. The printing system and the corresponding method carry out multi-valued coding with respect to the achromatic color ink based on the calculated density by the achromatic color ink, and determine formation or non-formation of achromatic color dots by the achromatic color ink. After obtaining correction data, which are to reflect the densities by the at least two chromatic color inks, based on the result of multi-valued coding with respect to the achromatic color ink, and correcting the densities by the at least two chromatic color inks, the system and the method carry out multi-valued coding with respect to the at least two chromatic color dots of different hues, based on the corrected densities by the at least two chromatic color inks, and determine formation or non-formation of the at least two chromatic color dots of different hues. The head is subsequently driven based on the results of determination with respect to the achromatic color dots and the at least two chromatic color dots, in order to actually form the at least two chromatic color dots of different hues by the at least two chromatic color inks as well as the achromatic color dots by the achromatic color ink.

In the third printing system, formation of achromatic color dots affects formation of at least two chromatic color dots. It can be considered that the achromatic color dots include the components of chromatic colors. This structure enables the on/off state of the at least two chromatic color dots of different hues to be appropriately controlled by the on/off state of achromatic color dots (for example, black dots).

The present invention is also directed to a recording medium, on which a third program for realizing the above image recording method on a computer is recorded. The third program is readable by a computer, which is connected to a printing system with a head for forming at least two types of chromatic color dots of different hues by at least two chromatic color inks as well as achromatic color dots by an achromatic color ink on a printing object, and records a multi-tone image through a distribution of the dots. The third program enables the computer to realize: a function of successively inputting tone signals regarding pixels included in an image to be printed; a function of calculating densities by the at least two chromatic color inks and a density by the achromatic color ink, based on the input tone signals; a function of carrying out multi-valued coding with respect to the achromatic color ink based on the calculated density by the achromatic color ink, and determining either one of formation and non-formation of achromatic color dots by the achromatic color ink; a function of obtaining correction data, which are to reflect the densities by the at least two chromatic color inks, based on the result of multi-valued coding with respect to the achromatic color ink, and correcting the densities by the at least two chromatic color inks; a function of carrying out multi-valued coding with respect to the at least two chromatic color dots of different hues, based on the corrected densities by the at least two chromatic color inks, and determining either one of formation and non-formation of the at least two chromatic color dots of different hues; and a function of driving the head based on the results of determination with respect to both the achromatic color dots and the at least two chromatic color dots, thereby actually forming the at least two chromatic color dots of different hues by the at least two chromatic color inks as well as the achromatic color dots by the achromatic color ink.

The third program recorded on the recording medium is read and executed by the computer. The computer executes the third program, determines formation or non-formation of dots, and drives the head mounted on the printing system, thus realizing the above image recording method.

The degree of effect of formation of dots by the achromatic color ink upon the density error regarding the chromatic color ink may be determined independently for the respective colors. Alternatively the effect may be distributed into the density errors regarding the at least two chromatic color inks.

In any one of the above printing systems, the head may have any available structure. By way of example, the head may have a mechanism for discharging ink particles under a pressure applied to each ink running through an ink conduit by application of a voltage to a piezoelectric element arranged in the ink conduit, or a mechanism for discharging ink particles under a pressure applied to each ink running through an ink conduit by air bubbles that are produced by a supply of electricity to a heating body arranged in the ink conduit.

In the above discussion, dots are physically formed on an object by means of ink. The principle of the present invention is, however, also applicable to display apparatuses, such as CRTs.

The present invention may thus be directed to an image display apparatus for forming at least two types of dots having different hues on an object and expressing a multi-tone image through a distribution of the dots. The image display apparatus of the present invention includes: input means for successively inputting multi-color tone signals regarding pixels included in an image to be displayed; first dot formation determination means for carrying out multi-valued coding with respect to one type of dots selected among the at least two types of dots having different hues, based on the input tone signal of a color corresponding to the one type of dots, and determining either one of formation and non-formation of the one type of dots; second dot formation determination means for enabling the result of multi-valued coding carried out by the first dot formation determination means to affect a display density to be realized by another type of dots having a different hue, carrying out multi-valued coding with respect to the another type of dots according to the recording density, and determining either one of formation and non-formation of the another type of dots; and dot formation means for actually forming the at least two types of dots having different hues, based on the results of determination by the first dot formation determination means and the second dot formation determination means.

The image display apparatus forms multi-tone dots, for example, on a CRT, so as to express an image. This structure is especially useful when the number of tones expressible by the CRT is smaller than the number of tones of an original image. Like in the printing systems discussed above, in the image display apparatus, the first dot formation determination means carries out multi-valued coding with respect to one type of dots selected among at least two types of dots having different hues, and determines formation or non-formation of the selected one type of dots. The second dot formation determination means enables the result of multi-valued coding to affect the display density to be realized by another type of dots having a different hue. The second dot formation determination means carries out multi-valued coding with respect to the another type of dots according to the affected display density, and determines formation or non-formation of the another type of dots. The dot formation means then actually forms the at least two types of dots having different hues, based on the results of determination by the first dot formation determination means and the second dot formation determination means.

The present invention also includes some other applications. The first application is a structure, in which one or related ones of the input means, the first dot formation determination means, and the second dot formation determination means are not included in the casing of the printing system but in an apparatus for outputting images to be printed. Both the first dot formation determination means and the second dot formation determination means may be realized by discrete circuits or alternatively by the software in an arithmetic and logic circuit including a CPU. In the latter case, the apparatus for outputting images to be printed, such as a computer, carries out the processing related to generation of dots. Only a mechanism for regulating discharge of inks from the head to actually form the generated dots, for example, on a sheet of paper, is disposed in the casing of the printing system. Another possible structure divides these required means into two groups, and enables one group to be realized in the casing of the printing system and the other group to be realized in the apparatus for outputting images.

The second application is a program supply apparatus for supplying the program that realizes any one of the above image recording methods via a communication network. Programs are stored on a server connected to the network. The computer downloads the required program from the server via the communication network and executes the program, in order to realize any one of the above image recording methods.

The third application is a print that is recorded according to the first image recording method discussed above. More concretely, the print is recorded according to the method of controlling a head that is able to form at least two types of dots having different hues on an object and recording a multi-tone image through a distribution of the dots, wherein method includes the steps of:

(a) successively inputting multi-color tone signals regarding pixels included in an image to be printed;

(b) carrying out multi-valued coding with respect to one type of dots selected among the at least two types of dots having different hues, based on the input tone signal of a color corresponding to the one type of dots, and determining either one of formation and non-formation of the one type of dots;

(c) enabling the result of multi-valued coding carried out in the step (b) to affect a recording density to be realized by another type of dots having a different hue, carrying out multi-valued coding with respect to the another type of dots according to the recording density, and determining either one of formation and non-formation of the another type of dots; and (d) driving the head based on the results of determination in the step (b) and in the step (c), thereby actually forming the at least two types of dots having different hues.

The present invention also provides prints recorded according to the second image recording method and the third image recording method as well as by the first through the third printing systems discussed above.

These and other objects, features, aspects, and advantages of the present invention will become more apparent from the following detailed description of the preferred embodiments with the accompanying drawings.

BRIEF DESCRIPTION OF THE DRAWINGS

FIG. 5 is a perspective view showing a color ink cartridge 70a;

FIG. 9 shows compositions of color inks used in the first embodiment;

DESCRIPTION OP THE PREFERRED EMBODIMENTS

Figure 1:
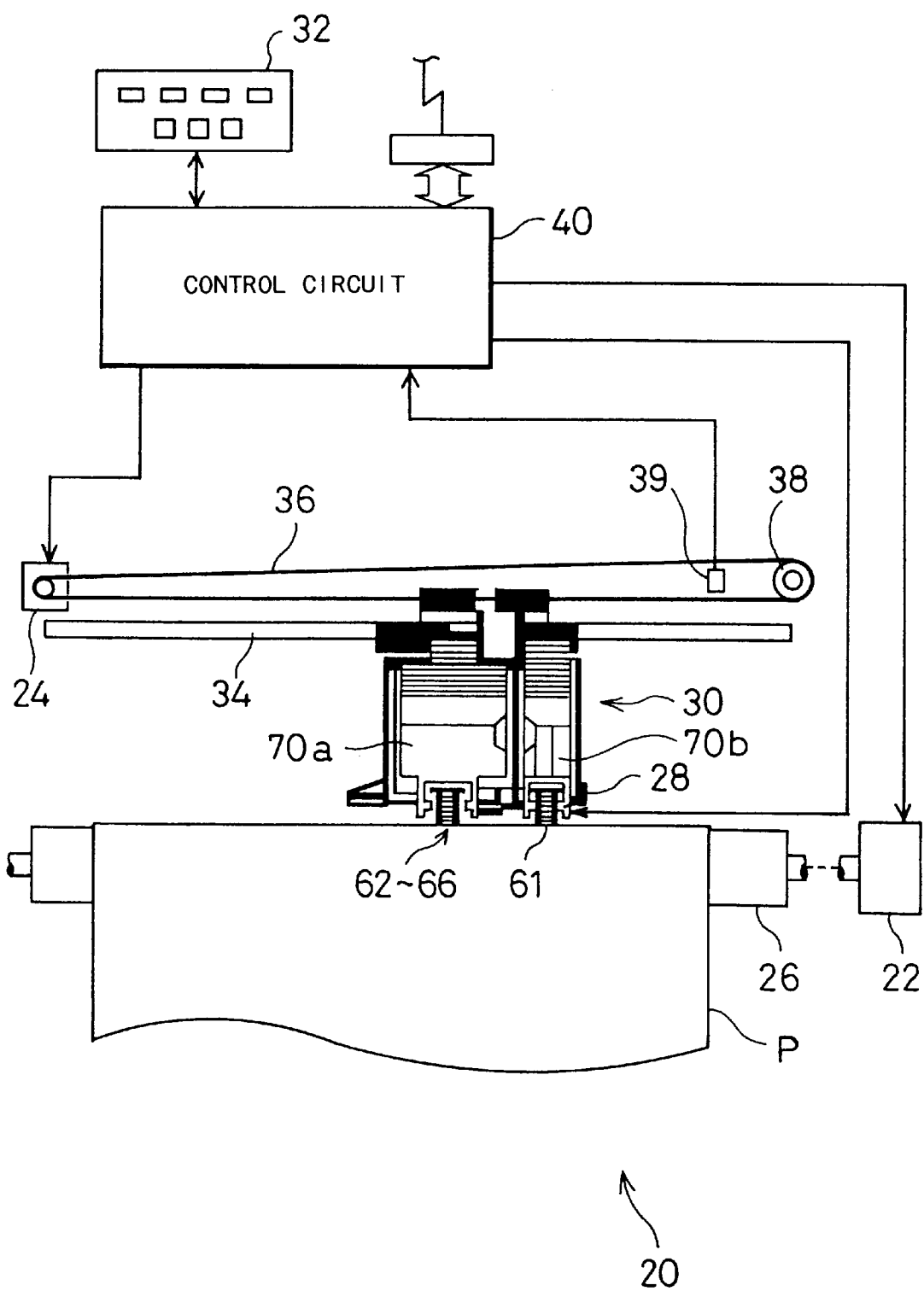
FIG. 1 schematically illustrates structure of a printer 20 as a first embodiment according to the present invention.

Some modes of carrying out the present invention are described below as preferred embodiments. FIG. 1 schematically illustrates structure of a printer 20 as a first embodiment according to the present invention. Referring to FIG. 1, the printer 20 has a mechanism for feeding a sheet of paper P by means of a sheet feed motor 22, a mechanism for reciprocating a carriage 30 along the axis of a platen 26 by means of a carriage motor 24, a mechanism for driving a print head 28 mounted on the carriage 30 to control discharge of ink and formation of dots, and a control circuit 40 for transmitting signals to and from the sheet feed motor 22, the carriage motor 24, the print head 28, and a control panel 32.

The mechanism for feeding the sheet of paper P has a gear train (not shown) for transmitting rotations of the sheet feed motor 22 to the platen 26 as well as a sheet feed roller (not shown). The mechanism for reciprocating the carriage 30 includes a sliding shaft 34 arranged in parallel with the axis of the platen 26 for slidably supporting the carriage 30, a pulley 38, an endless drive belt 36 spanned between the carriage motor 24 and the pulley 38, and a position sensor 39 for detecting the position of the origin of the carriage 30.

Figure 2:
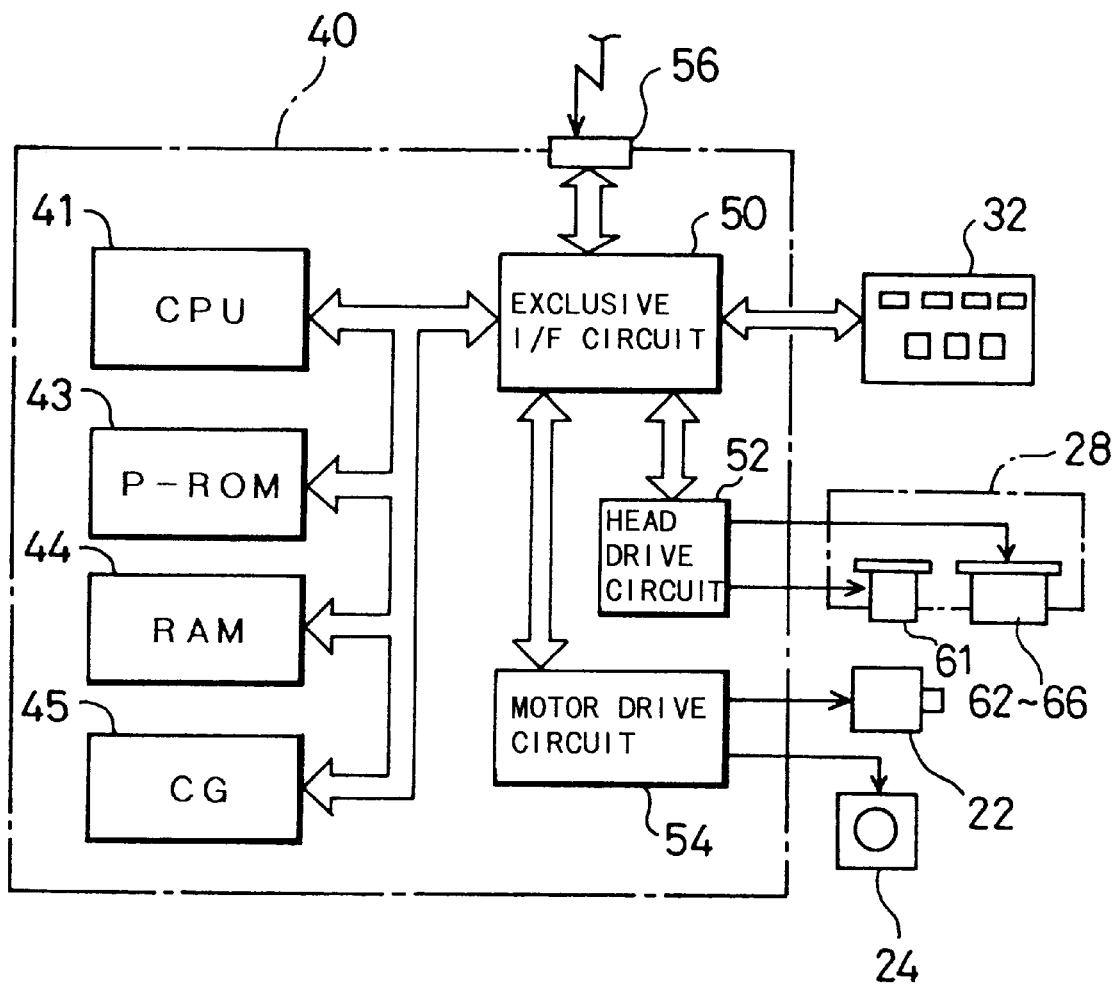
FIG. 2 is a block diagram showing structure of a control circuit 40 included in the printer 20.

FIG. 2 is a block diagram illustrating structure of the control circuit 40 and peripheral units included in the printer 20. Referring to FIG. 2, the control circuit 40 is constructed as a known arithmetic and logic operation circuit including a CPU 41, a P-ROM 43 for storing programs, a RAM 44, and a character generator (CG) 45 for storing dot matrices of characters. The control circuit 40 further includes an exclusive I/F circuit 50 exclusively working as an interface to an external motor and the like, a head drive circuit 52 connected with the exclusive I/F circuit 50 for driving the print head 28, and a motor drive circuit 54 connected with the exclusive I/F circuit 50 for driving the sheet feed motor 22 and the carriage motor 24. The exclusive I/F circuit 50 includes a parallel interface circuit and is connected to a computer via a connector 56 to receive printing signals output from the computer. Output of image signals from the computer will be discussed later.

Figure 3:
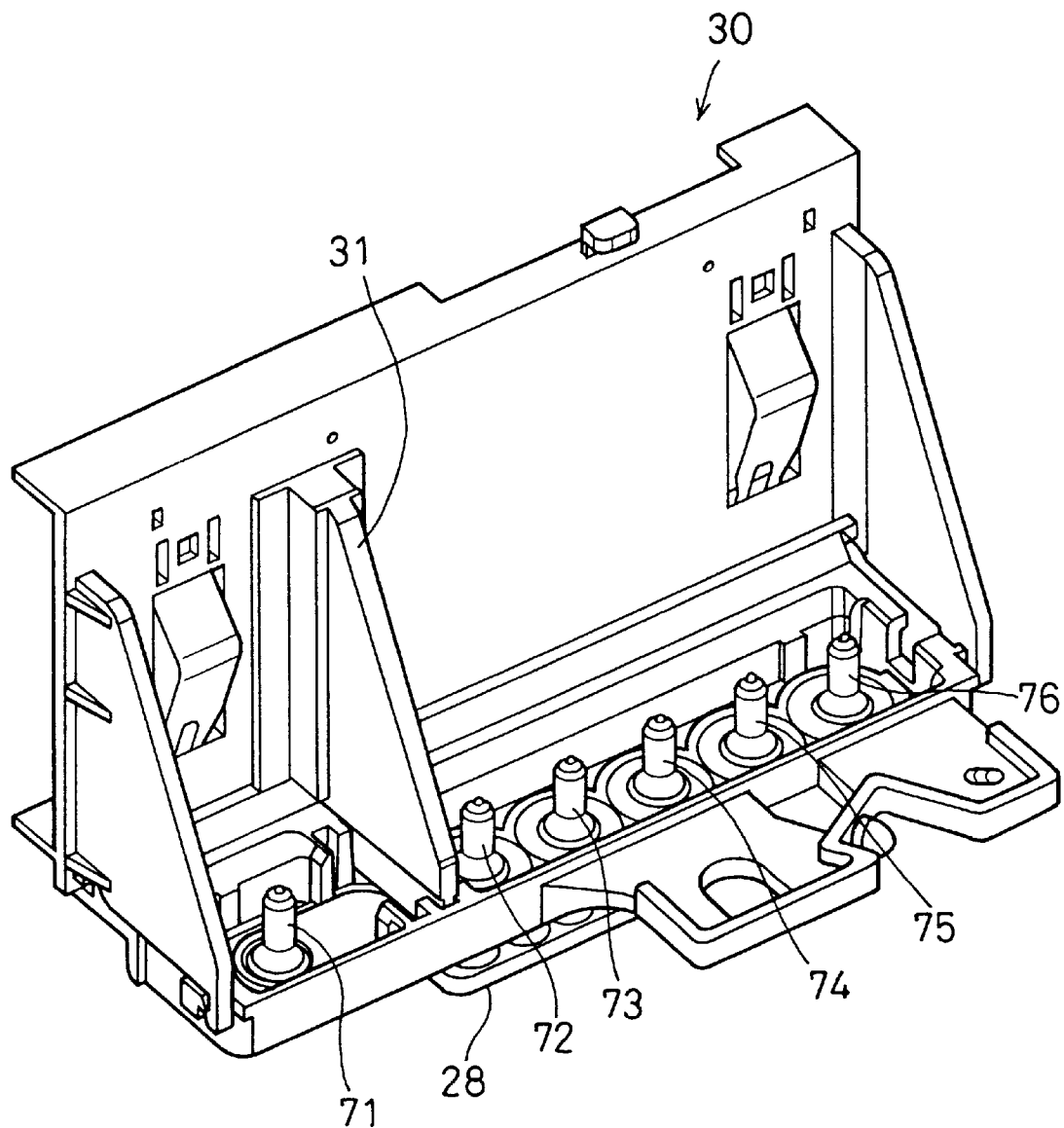
FIG. 3 is a perspective view illustrating structure of a carriage 30 included in the printer 20.
Figure 4:
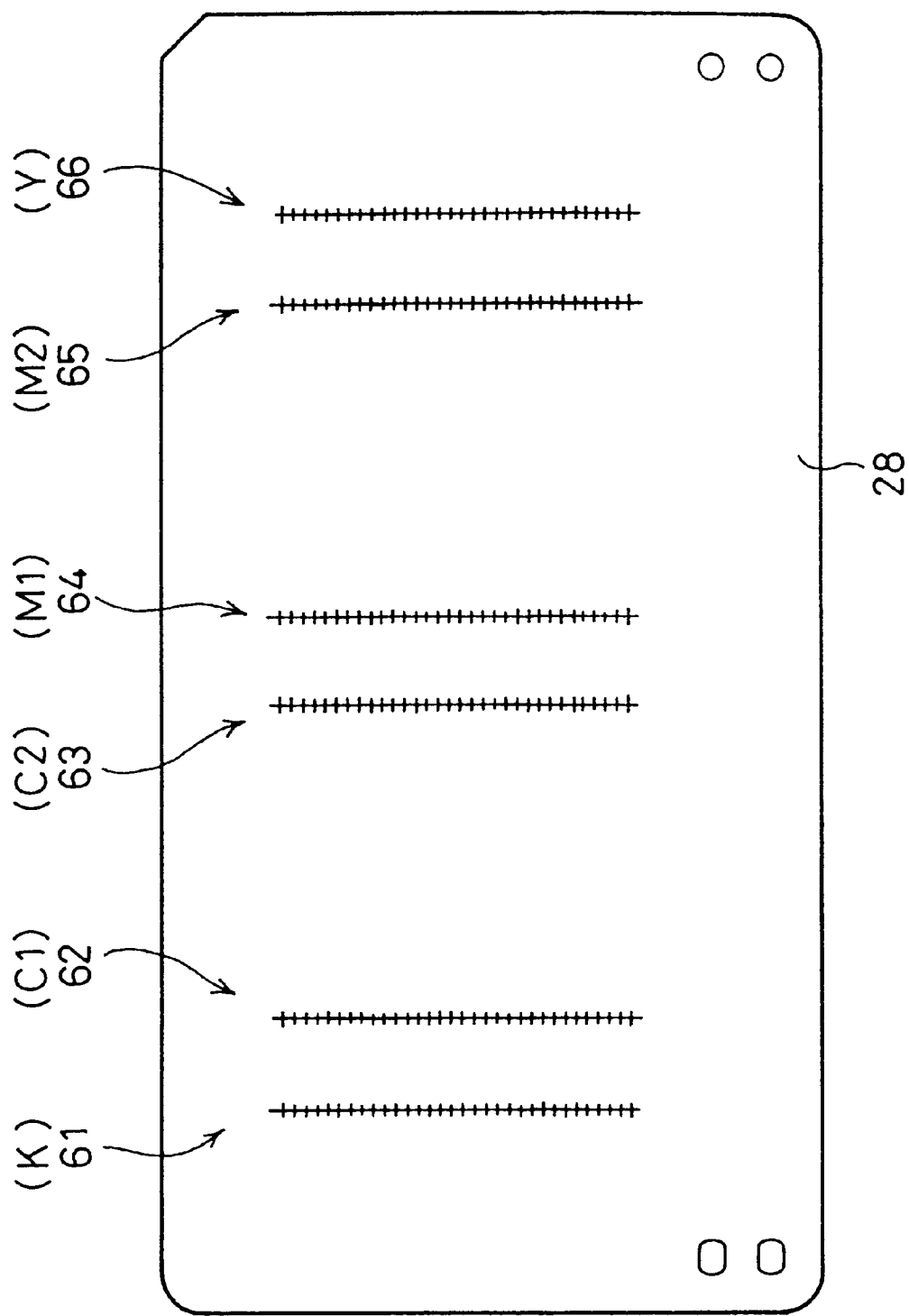
FIG. 4 shows an arrangement of color heads 61 through 66 in a print head 28.
Figure 5:
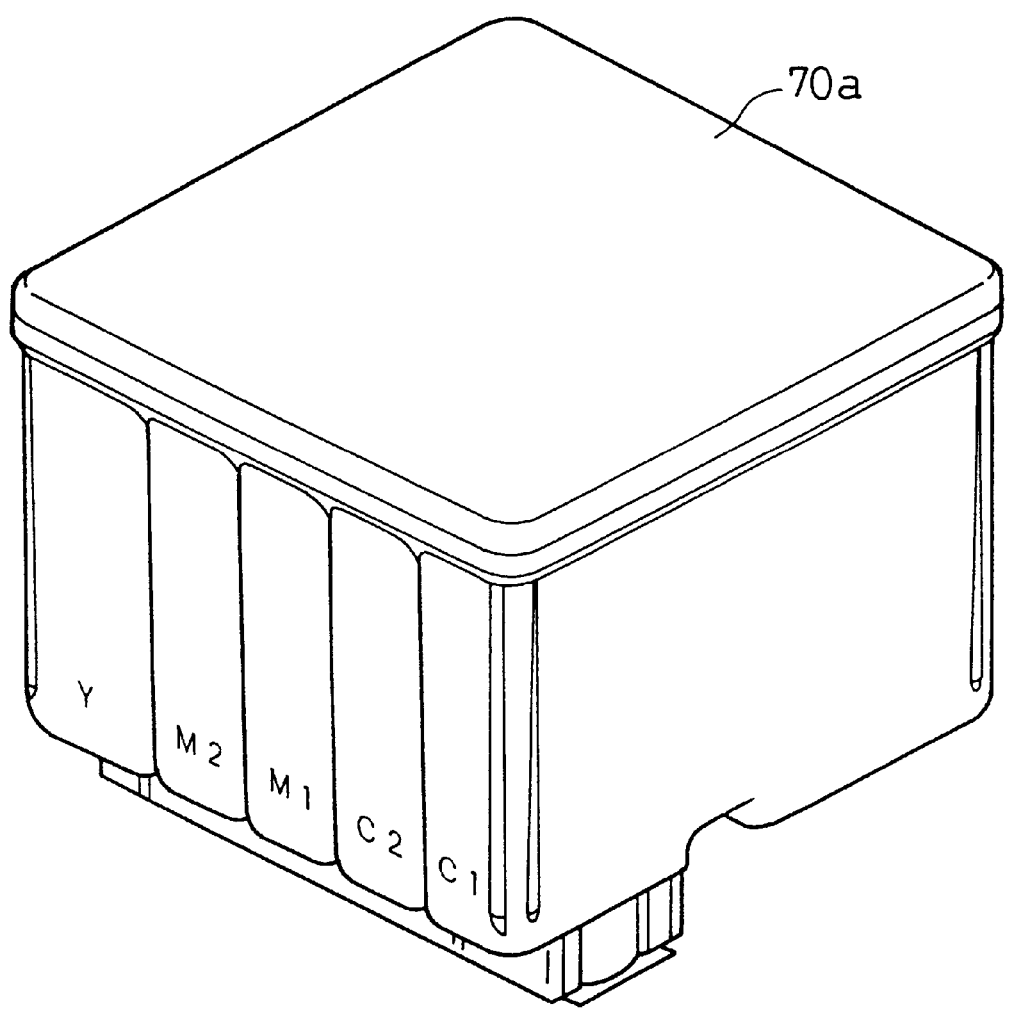

The following describes a concrete structure of the carriage 30 and the principle of discharging ink by the print head 28 mounted on the carriage 30. FIG. 3 is a perspective view showing structure of the carriage 30. FIG. 4 is a plan view illustrating nozzles arranged on the print head 28 set on the lower portion of the carriage 30 for spraying the respective color inks. A color ink cartridge 70*a* and a black ink cartridge 70*b* are attachable to the substantially L-shaped carriage 30 shown in FIG. 3. Detailed structure of the color ink cartridge 70*a* is shown in FIG. 5. A partition wall 31 separates the black ink cartridge 70*b* from the color ink cartridge 70*a*. Referring to FIG. 4, six color heads 61 through 66 for respectively discharging color inks are formed in the print head 28 that is disposed on the lower portion of the carriage 30. Ink supply pipes 71 through 76 for leading inks from ink tanks to the respective color heads 61 through 66 are formed upright on the bottom of the carriage 30 as shown in FIG. 3. When the color ink cartridge 70*a* and the black ink cartridge 70*b* are attached downward to the carriage 30, the ink supply pipes 71 through 76 are inserted into connection apertures (not shown) formed in the respective cartridges 70*a* and 70*b*.

Figure 6:
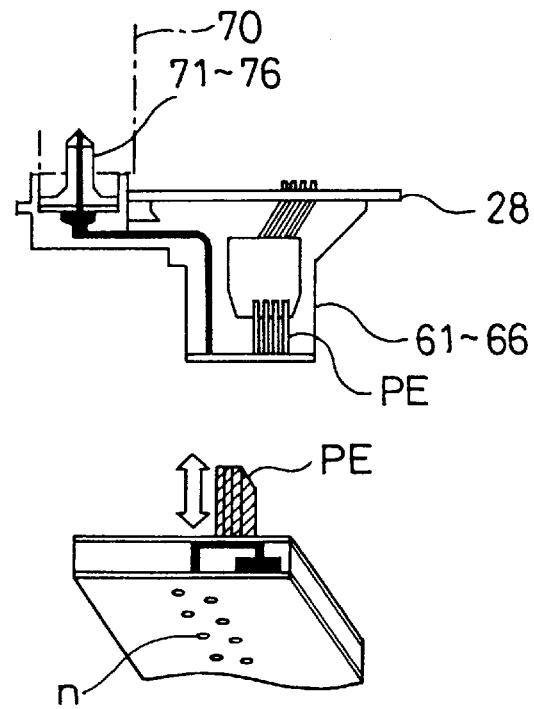
FIG. 6 shows a mechanism of ink discharge in each of the color heads 61 through 66.

When the ink cartridge 70 (including the color ink cartridge 70*a* and the black ink cartridge 70*b*) is attached to the carriage 30, inks in the ink cartridge 70 are sucked out by capillarity through the ink supply pipes 71 through 76 and are led to the color heads 61 through 66 formed in the print head 28 arranged on the lower portion of the carriage 30 as shown in FIG. 6. In case that the ink cartridge 70 is attached to the carriage 30 for the first time, a pump works to suck inks into the respective color heads 61 through 66. In this embodiment, structures of the pump for suction and a cap for covering the print head 28 during the suction are not illustrated nor described specifically.

Figure 7A:
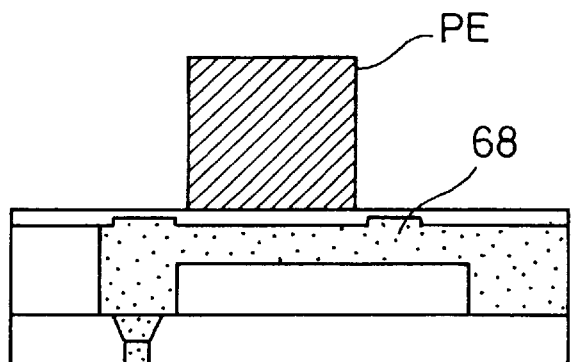
FIGS. 7A and 7B show a process of discharging ink particles Ip by extension of a piezoelectric element PE.
Figure 7B:
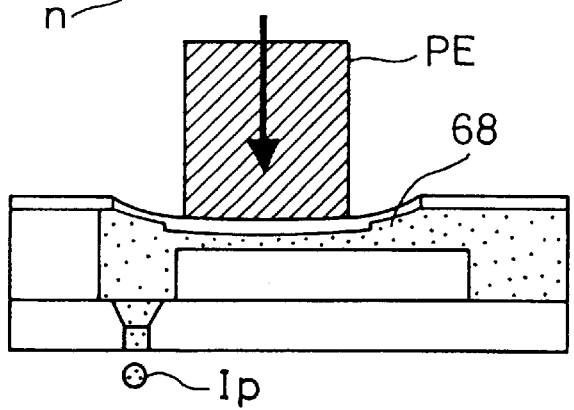

A row of thirty-two nozzles 'n' are formed in each of the color heads 61 through 66 as shown in FIGS. 4 and 6. A piezoelectric element PE having excellent response, which is one of electrically distorting elements, is arranged for each row of nozzles 'n'. FIG. 7A and 7B illustrate a configuration of the piezoelectric element PE and the nozzles 'n'. The piezoelectric element PE is disposed at a position that comes into contact with an ink conduit 68 for leading ink to the nozzles 'n'. As is known, the piezoelectric element PE has a crystal structure that is subjected to a mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to abruptly extend and deform one side wall of the ink conduit 68 as shown in the drawing of FIG. 7B. The volume of the ink conduit 68 is reduced with an extension of the piezoelectric element PE, and a certain amount of ink corresponding to the volume reduction is sprayed as ink particles Ip from the ends of the nozzles 'n' at a high speed. The ink particles Ip soak into the sheet of paper P set on the platen 26, so as to print images.

In order to ensure spaces for the piezoelectric elements PE, the six color heads 61 through 66 are divided into three pairs on the print head 28 as shown in FIG. 4. The first pair includes the black ink head 61 that is arranged at one end close to the black ink cartridge 70*b* and the cyan ink head 62 that is disposed next to the black ink head 61. The second pair includes the light cyan ink head 63 for cyan ink having the lower density than that of the standard cyan ink supplied to the cyan ink head 62 (hereinafter referred to as light cyan ink) and the magenta ink head 64. The third pair includes the light magenta ink head 65 for magenta ink having the lower density than that of the standard magenta ink supplied to the magenta ink head 64 (hereinafter referred to as light magenta ink) and the yellow ink head 66. The compositions and densities of the respective inks will be discussed later.

Figure 8:
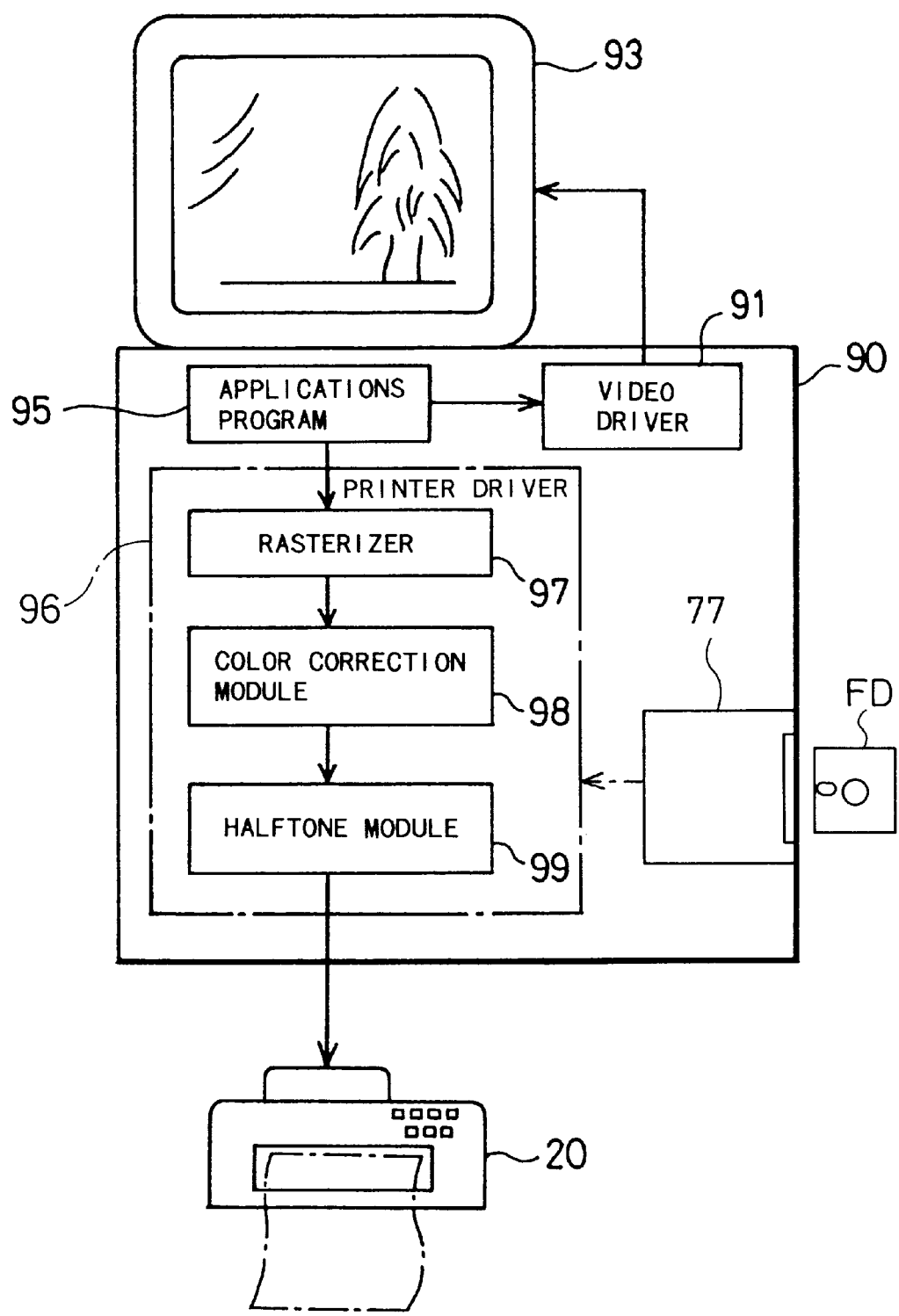
FIG. 8 is a block diagram showing a series of processes that enable a computer 90 to print images based on image information.

In the printer 20 of the embodiment having the hardware structure discussed above, while the sheet feed motor 22 rotates the platen 26 and the other related rollers to feed the sheet of paper P, the carriage motor 24 drives and reciprocates the carriage 30, simultaneously with actuation of the piezoelectric elements PE on the respective color heads 61 through 66 of the print head 28. The printer 20 accordingly sprays the respective color inks and transfers multi-color images onto the sheet of paper P. Referring to FIG. 8, the printer 20 prints multi-color images based on signals output from an image production apparatus, such as a computer 90, via the connector 56. In this embodiment, an applications program 95 working in the computer 90 processes images and displays the processed images on a CRT display 93 via a video driver 91. When the applications program 95 outputs a printing instruction, a printer driver 96 in the computer 90 receives image information from the applications program 95 and the printer 20 converts the image information to printable signals.

The printer driver 96 represents programs corresponding to the image recording method of the present invention. In this embodiment, programs recorded on a recording medium, for example, a flexible disk FD, are read by a disk drive 77 and extended in an internal RAM of the computer 90, so as to allow execution by the computer 90. A controller connected to the disk drive 77 and known elements of the computer 90 including a CPU, a RAM, and a ROM are omitted from the illustration of FIG. 8. In the example of FIG. 8, the printer driver 96 includes a rasterizer 97 for converting the image information processed by the applications program 95 to dot-based color information, a color correction module 98 for causing the image information that has been converted to the dot-based color information (tone data) to be subjected to color correction according to the colorimetric characteristics of an image output apparatus, such as the printer 20, and a halftone module 99 for generating halftone image information, which expresses density of a specified area by the existence or non-existence of ink in each dot unit, from the color-corrected image information. Operations of these modules are known to the skilled in the art and are thus not specifically described here in principle, though the contents of the halftone module 99 will be discussed later.

As discussed above, the printer 20 of the embodiment has the additional heads 63 and 65 for light cyan ink and light magenta ink other than the four heads 61, 62, 64, and 66 for the standard four color inks K, C, M, and Y in the print head 28. As shown in FIG. 9, light cyan ink and light magenta ink have lower dye densities than those of the standard cyan ink and magenta ink. Cyan ink of standard density (defined as C1 in FIG. 9) includes 3.6% by weight of Direct blue 199 as a dye, 30% by weight of diethylene glycol, 1% by weight of Surfinol 465, and 65.4% by weight of water. Light cyan ink (defined as C2 in FIG. 9), on the other hand, includes only 0.9% by weight of Direct blue 99, that is, one quarter the dye density of the cyan ink C1, and 35% by weight of diethylene glycol and 63.1% by weight of water for adjustment of the viscosity. Magenta ink of standard density (defined as M1 in FIG. 9) includes 2.8% by weight of Acid red 289 as a dye, 20% by weight of diethylene glycol, 1% by weight of Surfinol 465, and 76.2% by weight of water. Light magenta ink (defined as M2 in FIG. 9), on the other hand, includes only 0.7% by weight of Acid red 289, that is, one quarter the dye density of the magenta ink M1, and 25% by weight of diethylene glycol and 73.3% by weight of water for adjustment of the viscosity.

Yellow ink Y includes 1.8% by weight of Direct Yellow 86 as a dye, whereas black ink K includes 4.8% by weight of Food black 2 as a dye. All these inks are adjusted to have the viscosity of approximately 3 [mPa.s]. In this embodiment, the respective color inks are prepared to have substantially the same surface tension as well as the viscosity of identical level. This enables identical control of the piezoelectric elements PE for the respective color heads 61 through 66, irrespective of the inks for creating dots.

Figure 10:
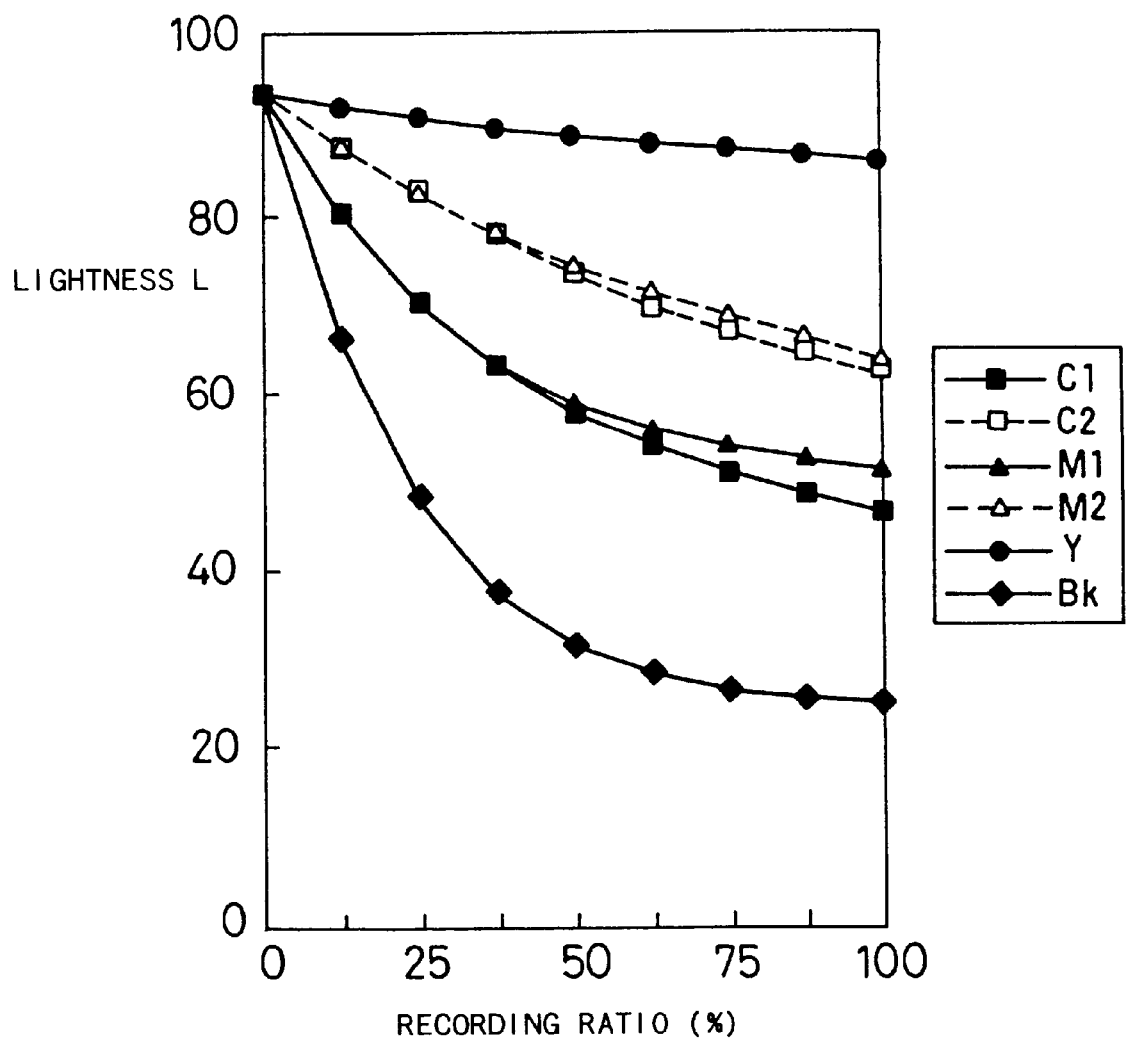
FIG. 10 is a graph showing the lightness plotted against the recording ratio of each color ink.

FIG. 10 is a graph showing the lightness of these color inks. The abscissa of FIG. 10 denotes the recording ratio to the recording resolution of the printer, that is, the proportion of printing dots formed on the white sheet of paper P by the ink particles Ip sprayed out of the nozzles 'n'. The recording ratio=100 represents the state, in which the whole surface of the sheet of paper P is covered with the ink particles Ip. In this embodiment, the light cyan ink C2 has approximately one quarter the dye density (percent by weight) of the cyan ink C1 as mentioned previously. The lightness of the light cyan ink C2 at the recording ratio of 100% is substantially equal to the lightness of the cyan ink C1 at the recording ratio of approximately 35%. This relationship is also applicable to the lightness of the magenta ink M1 and the light magenta ink M2. The proportion of the recording ratios of different-density inks giving the identical lightness is specified by the beauty of color mixture in case that the two different-density inks are mixed in print. In practice, it is desirable to adjust the proportion in the range of 20% to 50%. This relationship is substantially equivalent to the adjustment of the dye density (percent by weight) of the lower-density ink (the light cyan ink C2 or the light magenta ink M2) to almost one fifth to one third the dye density (percent by weight) of the higher-density ink (the cyan ink C1 or the magenta ink M1).

The following describes the processing executed by the halftone module 99 in the printer driver 96. In the first embodiment, formation of dots of cyan ink and magenta ink, which are chromatic color inks of different hues, depends upon formation of dots of black ink, which is an achromatic color ink. The fundamental technique of correlating formation of dots for a plurality of inks is discussed prior to description of the principle of the first embodiment. By way of example, formation of dots for the higher-density cyan ink C1 is correlated with formation of dots for the lower-density light cyan ink C2. The first embodiment discussed later extends this fundamental technique and carries out the halftone process for correlating formation of dots for inks of different hues.

Figure 11:
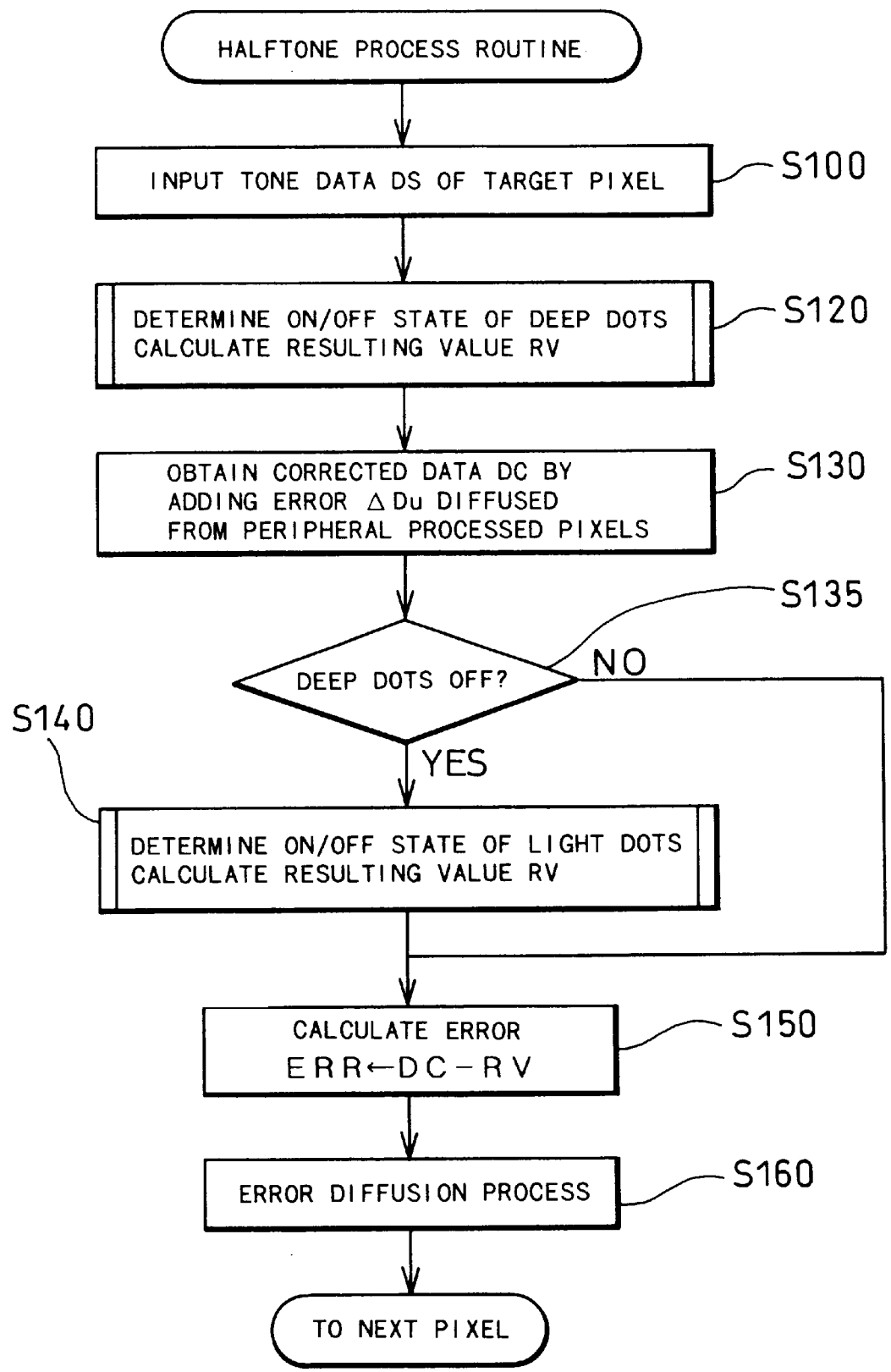
FIG. 11 is a flowchart showing a processing routine executed in a halftone module 99.

The flowchart of FIG. 11 shows an exemplified process of correlating formation of two different types of dots having different densities. When the printing process starts, pixels are successively scanned from the upper left corner of one image set as the origin. The halftone module 99 receives color-corrected tone data DS (8 bits respectively for C, M, Y, and K) of one pixel in the order along the scanning direction of the carriage 30 from the color correction module 98 at step S100.

The following description is on the assumption that images are printed only in cyan ink. In the actual state, however, images are printed in multiple colors; deep dots and light dots of magenta are formed by the higher-density magenta ink M1 and the lower-density light magenta ink M2, whereas dots of yellow and dots of black are respectively formed by the yellow ink Y and the black ink K. In case that dots are formed by different color inks in a predetermined area, required control is carried out to realize the favorable color reproduction by color mixture. For example, the control procedure does not allow dots of different colors to be printed on the same position.

The program then proceeds to step S120 to determine the on/off state of deep dots, based on the input tone data DS. The process of determining the on/off state of deep dots follows a routine of determining formation of deep dots shown in the flowchart of FIG. 12. When the program enters the routine of FIG. 12, the halftone module 99 refers to a table shown in FIG. 13 and generates deep level data Dth based on the input tone data DS at step S122. FIG. 13 is a table showing the recording ratios of light ink and deep ink plotted against the tone data of the original image. The tone data DS take the values of 0 to 255 for each color (8 bit-data for each color), and the magnitude of the tone data is accordingly expressed, for example, as 16/256 in the following description. The table of FIG. 13 shows the ratio of deep ink to light ink in a resulting print, and does not unequivocally specify the recording ratios of deep ink and light ink against a certain piece of tone data DS to determine the on/off state of dots by deep ink or light ink in a target pixel. The fundamental technique shown in the flowchart of FIG. 11 first determines the on/off state of deep according to the table of FIG. 13 at step S120 and then determines the on/off state of light dots based on the results of determination for deep dots at step S140. Coincidence between the obtained recording ratio of light dots and data in the table of FIG. 13 is ascribed to the following reason.

The density of an image per unit of area is expressed by the number of deep dots and light dots formed therein. According to the table of FIG. 13, the number of deep dots formed per unit of area is expressed as the ratio to the maximum density, which corresponds to the value '255', and is hereinafter referred to as Ks. In a similar manner, Us represents the number of light dots. In order to enable the density of a resulting image to be identical with tone data DS of an input image, the following equation should be satisfied:

$$DS=Ks\times(\text{Evaluation value of deep dots})/255+Us\times(\text{Evaluation value of light dots})/255$$

Since the evaluation value of deep dots (density of created dots) can be regarded as 255, the table of light dots shown in FIG. 13 depends upon the table of deep dots and the evaluation value of light dots. In the example of FIG. 13, data regarding a point that gives the maximum recording ratio of light dots (tone data=95, deep dot data=18, and light dot data=122) is substituted into the above equation. This specifies the evaluation value of light dots z as:

$$95=18\times255/255+122\times z/255$$

The evaluation value of light dots z given by this equation is equal to 160. The evaluation value of deep dots and the evaluation value of light dots are identical with resulting values RV that are used in the flowchart of determining the on/off state of deep dots and light dots discussed later.

At step S122, deep level data Dth (right ordinate in FIG. 13) corresponding to a predetermined recording ratio of deep ink is read from the table of FIG. 13, based on the input tone data DS. For example, in case that the input tone data of cyan represents a solid area of 50/256, the recording ratio of the deep cyan ink C1 is equal to 0%, so that the value of deep level data Dth is equal to zero. In case that the input tone data represents a solid area of 95/256, the recording ratio of the deep cyan ink C1 is equal to 7%, so that the value of deep level data Dth is equal to 18. In case that the input tone data represents a solid area of 191/256, the recording ratio of the deep cyan ink C1 is equal to 75%, so that the value of deep level data Dth is equal to 191. In the routine of determining the on/off state of light dots formed by a lighter ink discussed below, the corresponding recording ratios of the light cyan ink C2 are 36%, 58%, and 0%, respectively.

Figure 12:
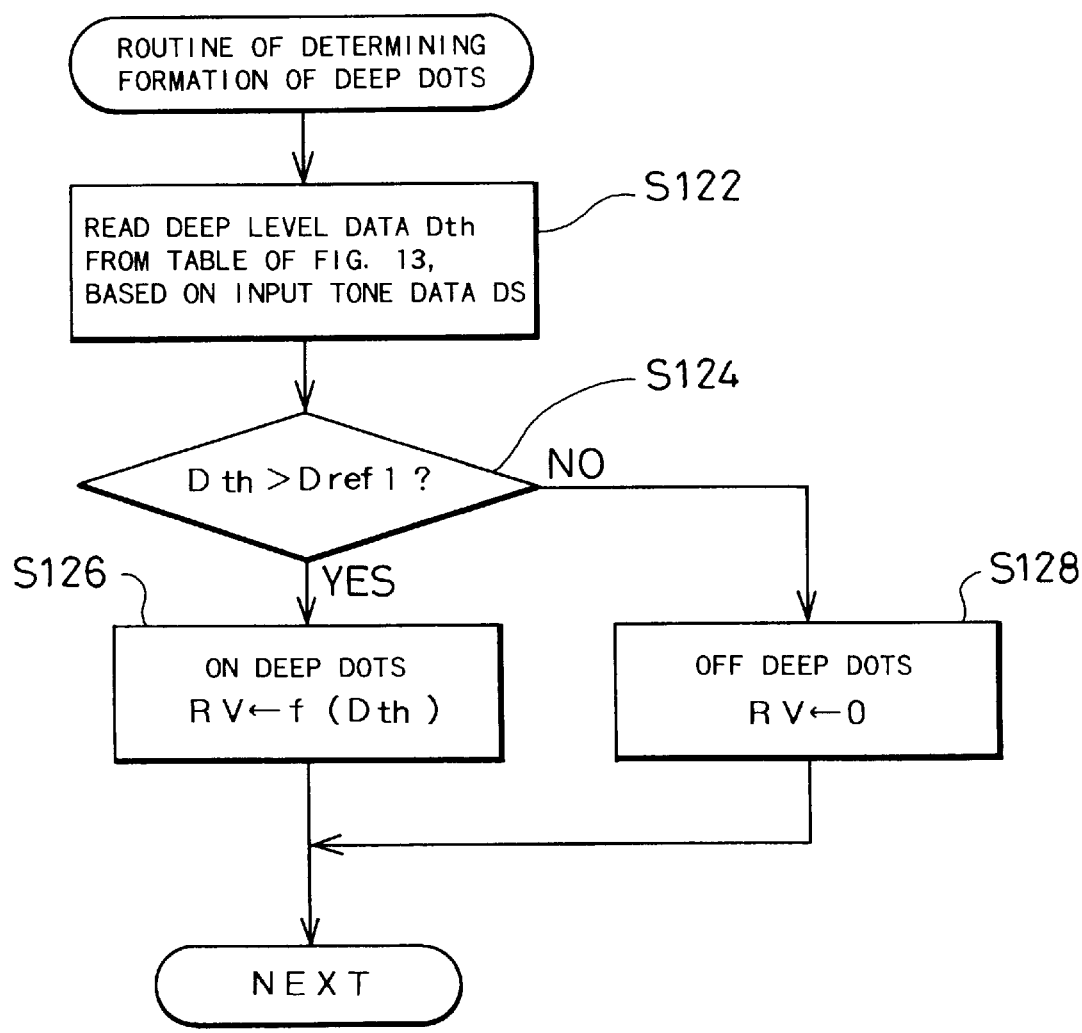
FIG. 12 is a flowchart showing a routine of determining formation of deep dots.
Figure 13:
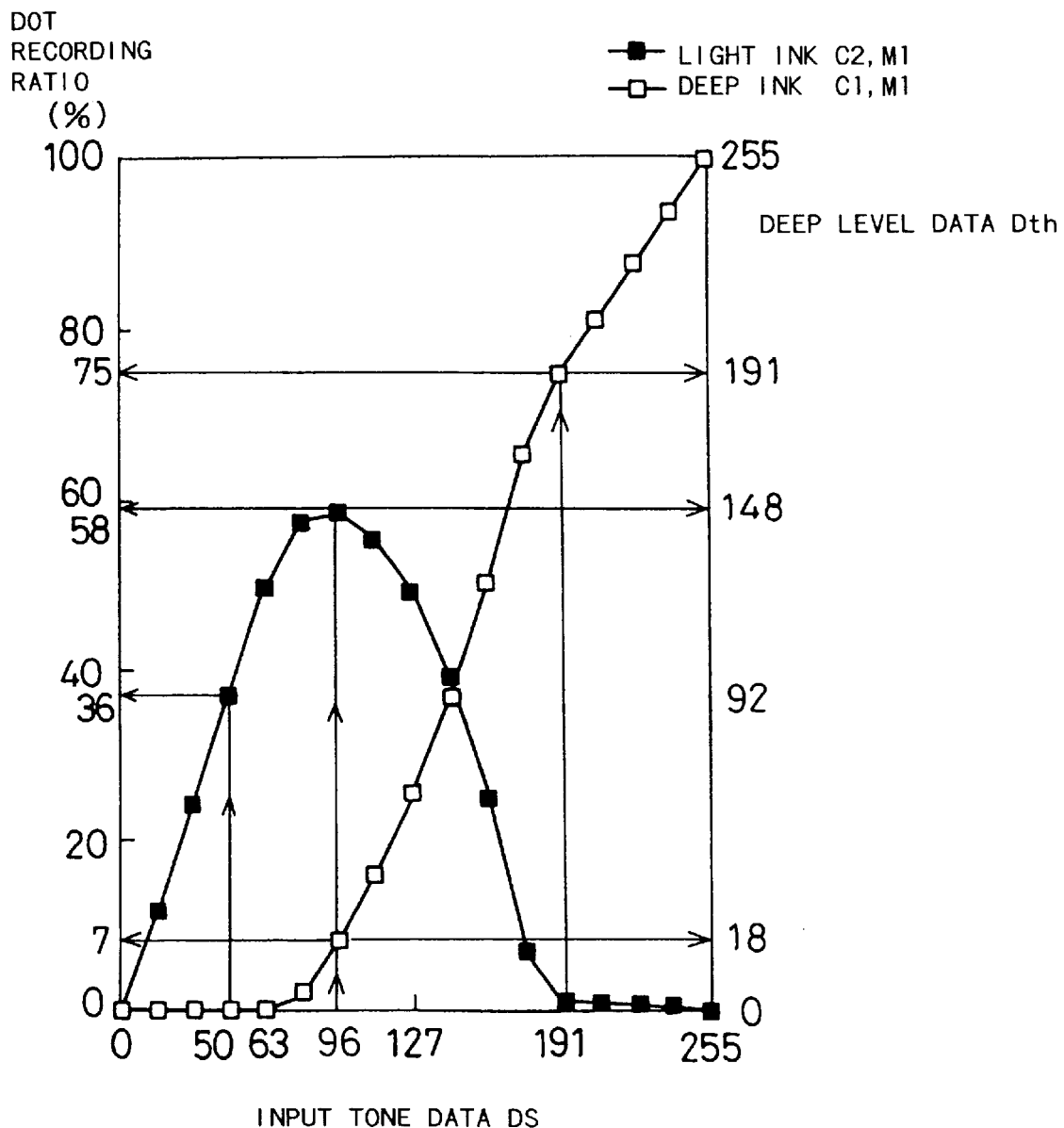
FIG. 13 is a table showing the relationship between tone data and recording ratios of light ink and deep ink.
Figure 14:
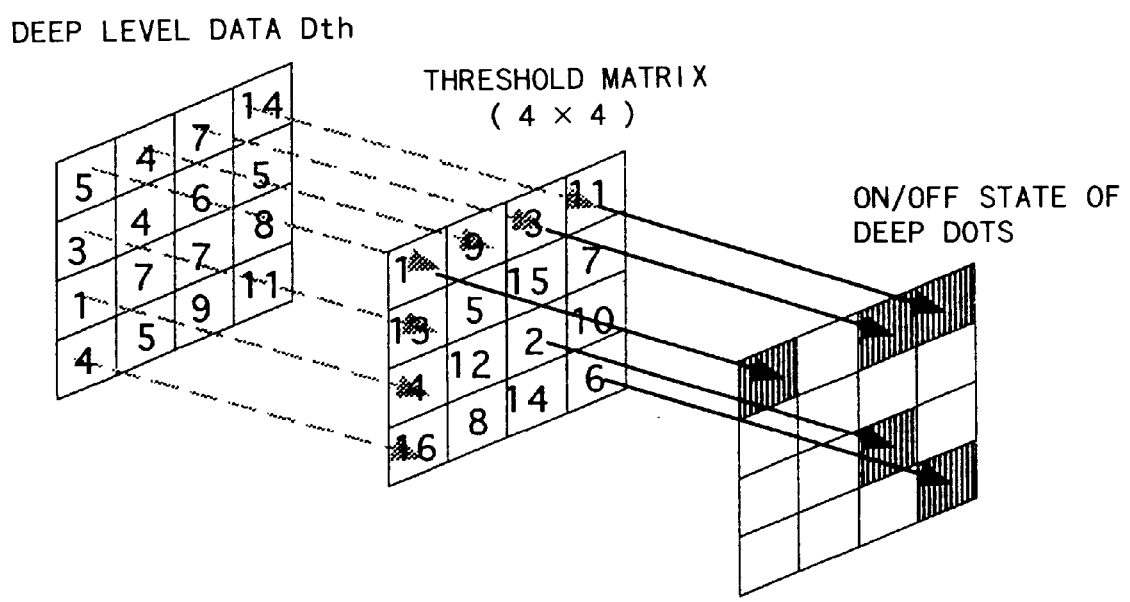
FIG. 14 shows a technique of determining the on/off state of deep dots by the systematic dither method.

The deep level data Dth thus obtained is then compared with a threshold value Dref1 at step S124 in the flowchart of FIG. 12. The threshold value Dref1 is a reference value for determining whether or not dots of deep ink should be formed in a target pixel, and may be fixed to approximately half the maximum of deep level data Dth. In this example, systematic dither method using a threshold matrix of discrete dither is applied to set the threshold value. The threshold matrix of discrete dither used here is, for example, a wide-range matrix of 64×64 in size (blue noise matrix). Different threshold values Dref1 used for determining the on/off state of deep dots are accordingly set for the respective target pixels. FIG. 14 shows the principle of the systematic dither method. Although the matrix shown in FIG. 14 has the size of 4×4 as a matter of convenience of illustration, the matrix actually used has the size of 64×64. Threshold values (0 to 255) are specified to have no bias of appearance in any 16×16 areas included in the 64×64 matrix. The wide-range matrix effectively prevents occurrence of pseudo-contours. The discrete dither ensures high spatial frequencies of dots determined by the threshold matrix and makes dots sufficiently scattered in any specified area. A concrete example of the discrete dither is a Beyer's threshold matrix. Application of the discrete dither causes deep dots to be sufficiently scattered and realizes a non-biased distribution of deep dots and light dots, thereby improving the picture quality. Another technique, for example, density pattern method or pixel distribution method, may be applied to determine the on/off state of deep dots.

In case that the deep level data Dth is greater than the threshold value Dref1 at step S124 in the flowchart of FIG. 12, the program determines the on state of deep dots in the target pixel and calculates a resulting value RV at step S126. The resulting value RV corresponds to the density of the target pixel (evaluation value of deep dots). In the on state of deep dots, that is, when it is determined that dots of high-density ink are to be formed in the target pixel, the value corresponding to the density of the pixel (for example, the value 255) is set as the resulting value RV. The resulting value RV may be a fixed value or set as a function of deep level data Dth.

In case that the deep level data Dth is not greater than the threshold value Dref1 at step S124, on the contrary, the program determines the off state of deep dots, that is, no formation of dots by high-density ink in the target pixel, and sets the value '0' to the resulting value RV at step S128. Since the white background of the sheet of paper P remains in the place where no dots of high-density ink are formed, the resulting value RV is set equal to zero.

Referring back to the flowchart of FIG. 11, after determining the on/off state of deep dots and calculating the resulting value RV at step S120, the program proceeds to step S130 to calculate light dot data Dx used for determining the on/off state of light dots. At subsequent step S135, corrected data DC is obtained by adding a diffusion error ΔDu from the processed pixel to the light dot data Dx. The light dot data Dx is obtained by the following equation:

$$Dx=Dth\cdot Z/255+Dtn\cdot z/255$$

wherein Dtn denotes light level data read from the table of FIG. 13, based on the tone data DS, Z represents an evaluation value in case of the on state of deep dots, and z denotes an evaluation value in case of the on state of light dots. The light dot data Dx is a sum of the deep level data and the light level data respectively multiplied by weighting coefficients, which depend upon the respective evaluation values. One of the main characteristics of the present invention is that the on/off state of light dots is determined by the light dot data Dx, which is based on both the deep level data and the light level data. Since the evaluation value Z of deep dots is equal to 255, the above equation is rewritten as:

$$Dx=Dth+Dtn\cdot z/255$$

which is actually used to calculate the light dot data Dx at step S130. The evaluation value z of light dots is significantly smaller than the evaluation value Z of deep dots and is set equal to 160 in this embodiment.

Figure 15:
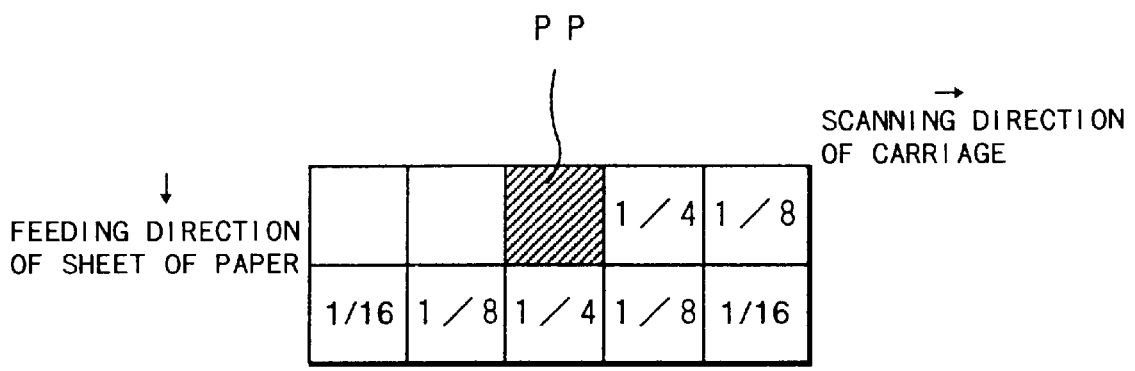
FIG. 15 shows weights added to the peripheral pixels, into which an error is distributed in the process of error distribution.

The corrected data DC is obtained at step S135 by adding the diffusion error ΔDu to the light dot data Dx, because error diffusion is carried out for light dots. In the printing process by error diffusion, a density error occurring in a processed pixel is distributed in advance into peripheral pixels around the processed pixel with predetermined weights. The processing of step S135 accordingly reads the corresponding error and causes the error to affect the target pixel to be printed next. FIG. 15 illustrates a process of distributing the error occurring in a processed pixel PP, for which the on/off state of light dots has been determined, into peripheral pixels with specified weights. The density error is distributed into several pixels after the processed pixel PP in the scanning direction of the carriage 30 and in the feeding direction of the sheet of paper P with predetermined weights (¼, ⅛, ¹⁄₁₆).

Figure 16:
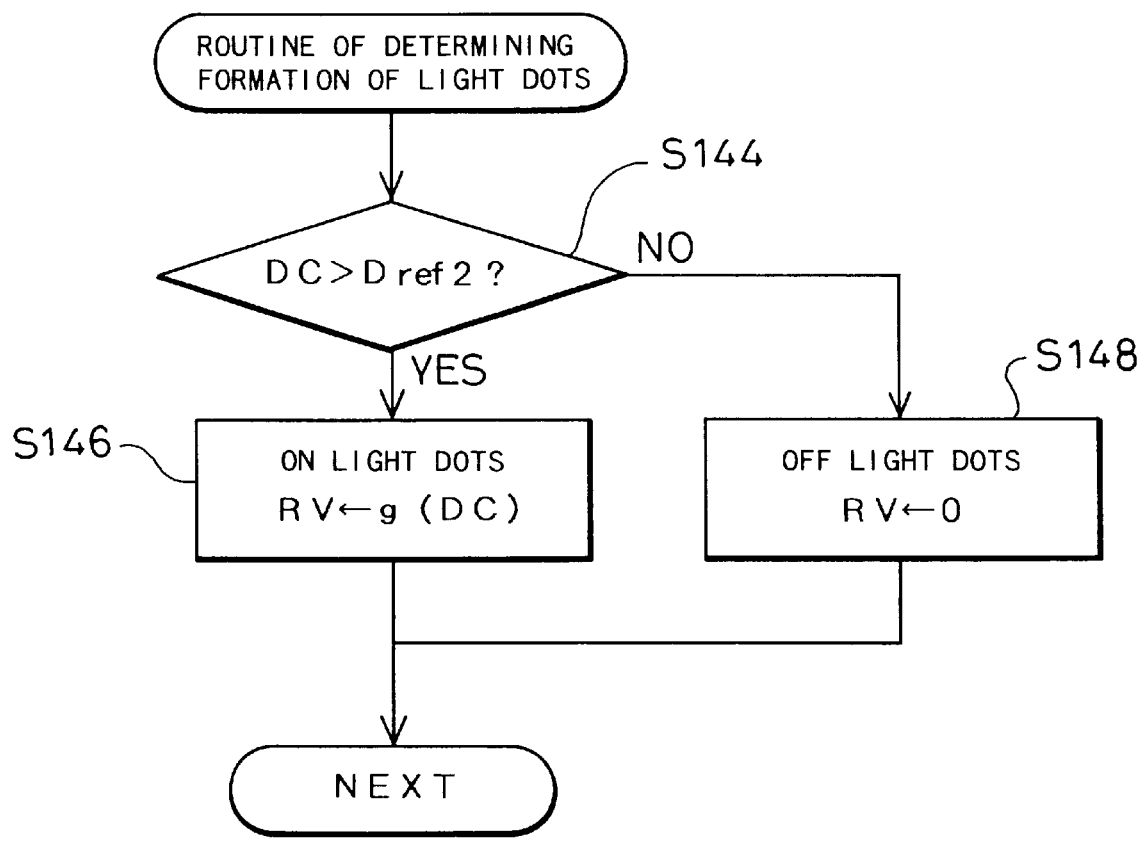
FIG. 16 is a flowchart showing a routine of determining formation of light dots.
Figure 17:
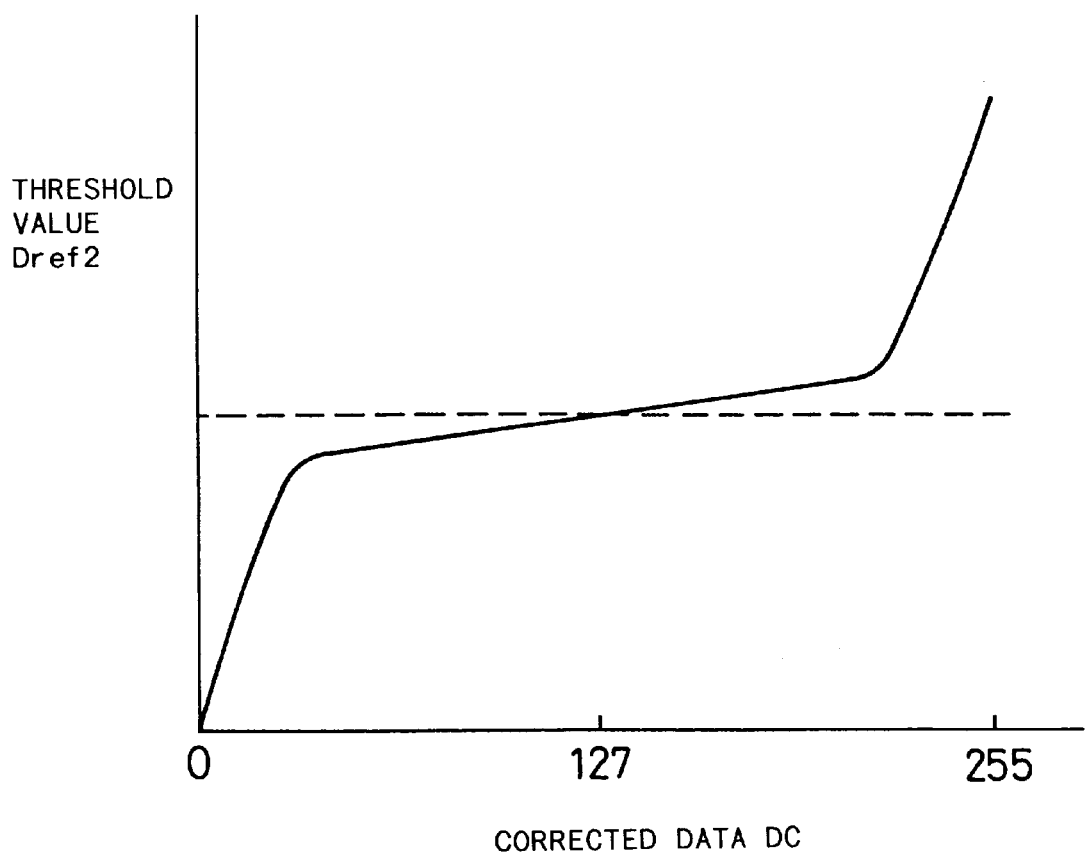
FIG. 17 is a graph showing the threshold value Dref2 plotted against the corrected data DC.

Referring back to the flowchart of FIG. 11, after the calculation of the corrected data DC, it is determined whether or not the pixel is in the off state of deep dots (that is, no dots of the cyan ink C1 are formed in the pixel) at step S138. In case of the off state of deep dots, that is, in case of no formation of deep dots, the program proceeds to step S140 to determine the on/off state of low-density dots, that is, dots by the light cyan ink C2 (hereinafter referred to as light dot). The process of determining the on/off state of light dots follows a routine of determining formation of light dots shown in the flowchart of FIG. 16. In this example, the error diffusion method is adopted to determine the on/off state of light dots, that is, formation of dots by the light cyan ink C2. When the program enters the routine of FIG. 16, the tone data DC corrected according to the concept of error diffusion is compared with a threshold value Dref2 for light dots at step S144. The threshold value Dref2 is a reference value for determining whether or not dots should be formed by the low-density, light ink in a target pixel. The threshold value Dref2 may be a fixed value, but is set as a variable varying with the corrected data DC in this example. FIG. 17 shows the relationship between the threshold value Dref2 and the corrected data DC. The threshold value Dref2 is set as a function of the corrected data DC as shown in FIG. 17. This effectively prevents delay of dot formation in the vicinity of the lower limit or upper limit of the tone or turbulence of dot formation (a trail of dots) observed in a certain range in the scanning direction under the condition of an abrupt change in tone in a specified area.

In case that the corrected data DC is greater than the threshold value Dref2 at step S144, the program determines the on state of light dots and calculates a resulting value RV (evaluation value of light dots) at step S146. The resulting value RV here has a reference value 122 and is corrected by the corrected data DC, although it may be a fixed value. In case that the corrected data DC is not greater than the threshold value Dref2 at step S144, on the contrary, the program determines the off state of light dots and sets the value '0' to the resulting value RV at step S148.

Referring back to the flowchart of FIG. 11, after determining the on/off state of light dots and calculating the resulting value RV at step S140, the program proceeds to step S150 to calculate an error ERR. The error ERR is obtained by subtracting the resulting value RV from the corrected data DC. In case that neither deep dots nor light dots are formed, the resulting value RV is equal to zero and the corrected data DC is set to the error ERR. In this case, no density to be realized is obtained in the target pixel, so that the density is specified as the error ERR. In case that either deep dots or light dots are formed, on the other hand, a value corresponding to the created dots is set to the resulting value RV, so that the difference between the corrected data DC and the resulting value RV is specified as the error ERR.

At subsequent step S160, the program carries out error diffusion. The error ERR obtained at step S150 is distributed into peripheral pixels around the target pixel with predetermined weights (see FIG. 15). After the error diffusion process, the program goes to a next pixel and repeats the processing of steps S100 through S160 for the next pixel.

Figure 18:
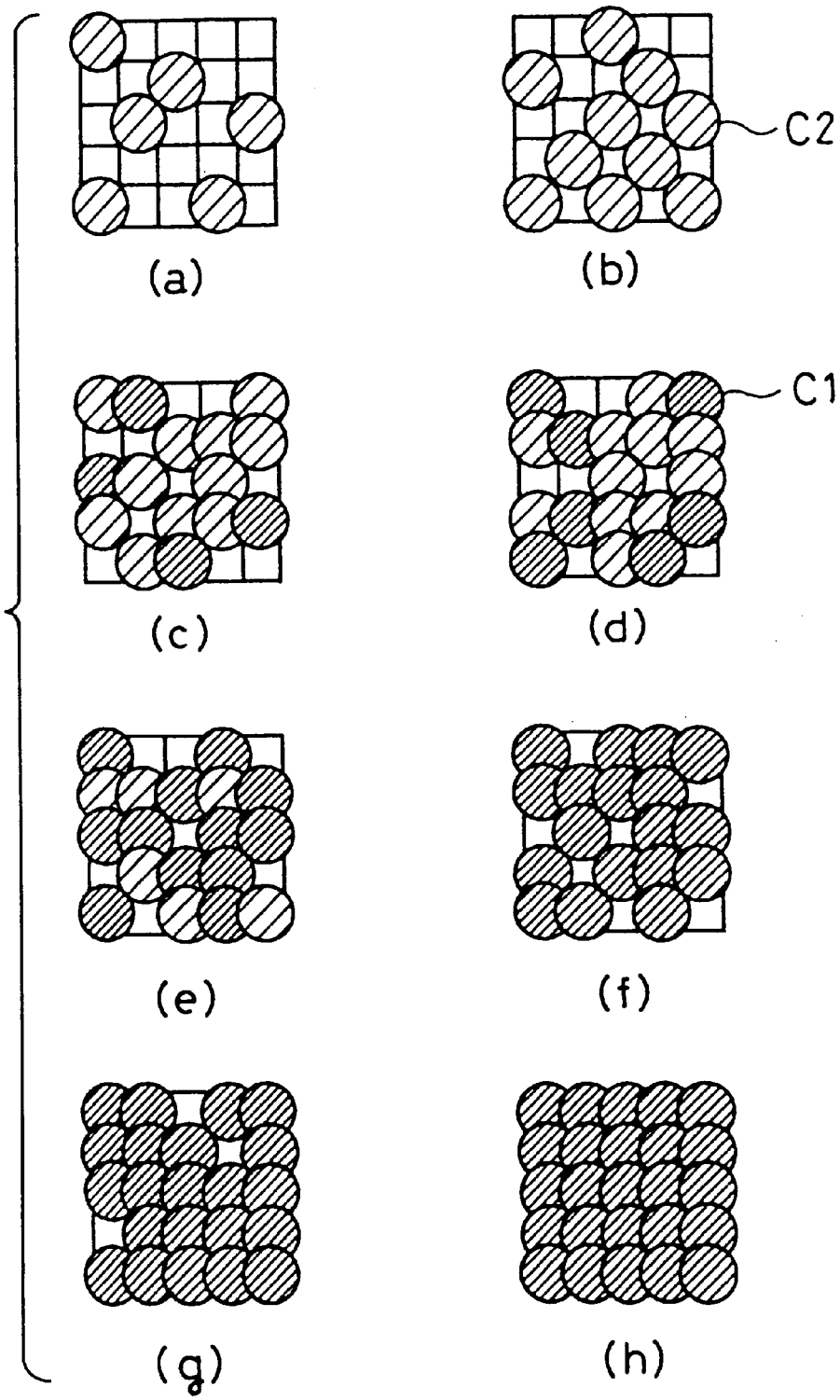
FIG. 18 shows formation of dots by a light ink C2 and formation of dots by a deep ink C1 in the first embodiment.

FIG. 18 shows examples of printing states of light dots and deep dots, with respect to the cyan ink C1 and the light cyan ink C2. In the range of low tone data (in the range of tone data=0/256 to 63/256 in this example), dots of only the light cyan ink C2 are formed as shown in FIG. 18. The proportion of light dots existing in a predetermined area increases with an increase in tone data.

In the range of tone data exceeding a predetermined value (in the range exceeding 64/256 in this example), formation of deep dots starts and gradually increases while the proportion of light dots still increases as shown in FIG. 18 as (c). In the range of higher tone data (in the range exceeding 95/256 in this example), the proportion of deep dots increases while the proportion of light dots decreases as shown in FIG. 18 as (d) and (e).

In the range of still higher tone data (in the range exceeding 191/256 in this example), no light dots but only deep dots are formed as shown in FIG. 18 as (f) and (g). when the tone data reaches the maximum, the recording ratio of deep dots is equal to 100% as shown in FIG. 18 as (h). In this state, the whole surface of the sheet of paper P is covered with the dots of high-density ink (cyan ink C1).

The procedure discussed above first determines the on/off state of dots formed by one ink (that is, the higher-density ink) and specifies the resulting value RV according to the on/off state of the dots by the higher-density ink. Only in case of no formation of dots by the higher-density ink, the procedure determines the on/off state of dots formed by the other ink (that is, the lower-density ink) and specifies the resulting value RV according to the on/off state of the dots by the lower density ink. This structure enables the on/off state of dots formed by one ink to affect the on/off state of dots formed by the other ink, thereby giving an appropriate printed image by the higher-density dots and the lower-density dots.

Figure 19:
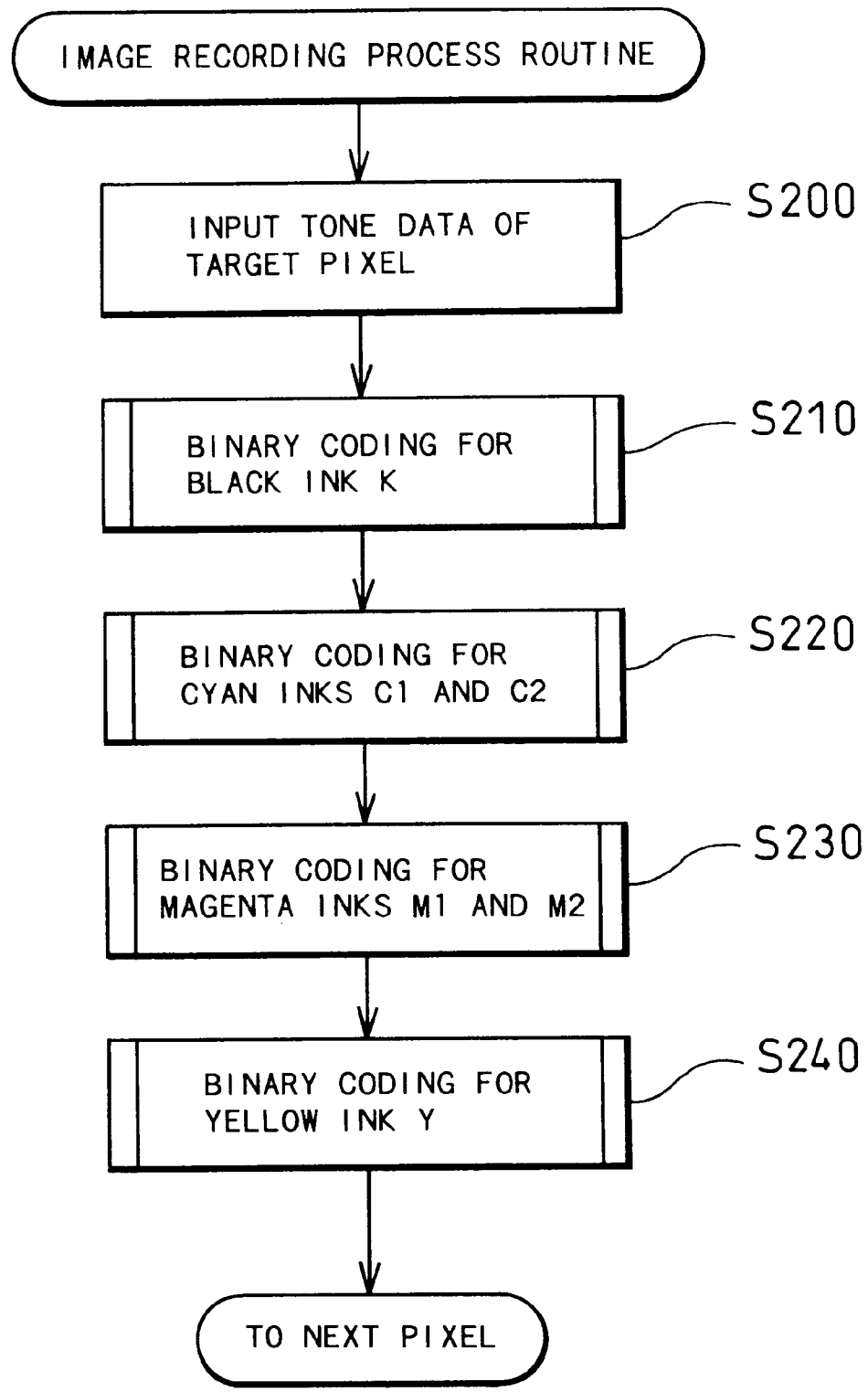
FIG. 19 is a flowchart showing an image recording process routine executed in the first embodiment.

The first embodiment of the present invention is based on the fundamental technique discussed above. The printing system of the first embodiment can record images with the total of six colors, that is, black ink K, cyan ink C1, light cyan ink C2, magenta ink M1, light magenta ink M2, and yellow ink Y, as mentioned previously. In the first embodiment, the halftone module 99 carries out an image recording process routine shown in the flowchart of FIG. 19. When the program enters the routine of FIG. 19, the halftone module 99 receives tone data of a target pixel at step S200 and executes binary coding for the black ink K at step S210. Details of the binarization for black ink executed at step S210 is shown in the flowchart of FIG. 20 and will be discussed later.

After the binary coding for the black ink K, the halftone module 99 successively carries out binary coding for the two cyan inks C1 and C2 having different densities at step S220, binary coding for the two magenta inks M1 and M2 having different densities at step S230, and binary coding for the yellow ink Y at step S240. Namely binary coding is executed for the total of six inks K, C1, C2, M1, M2, and Y, with respect to the target pixel.

Figure 20:
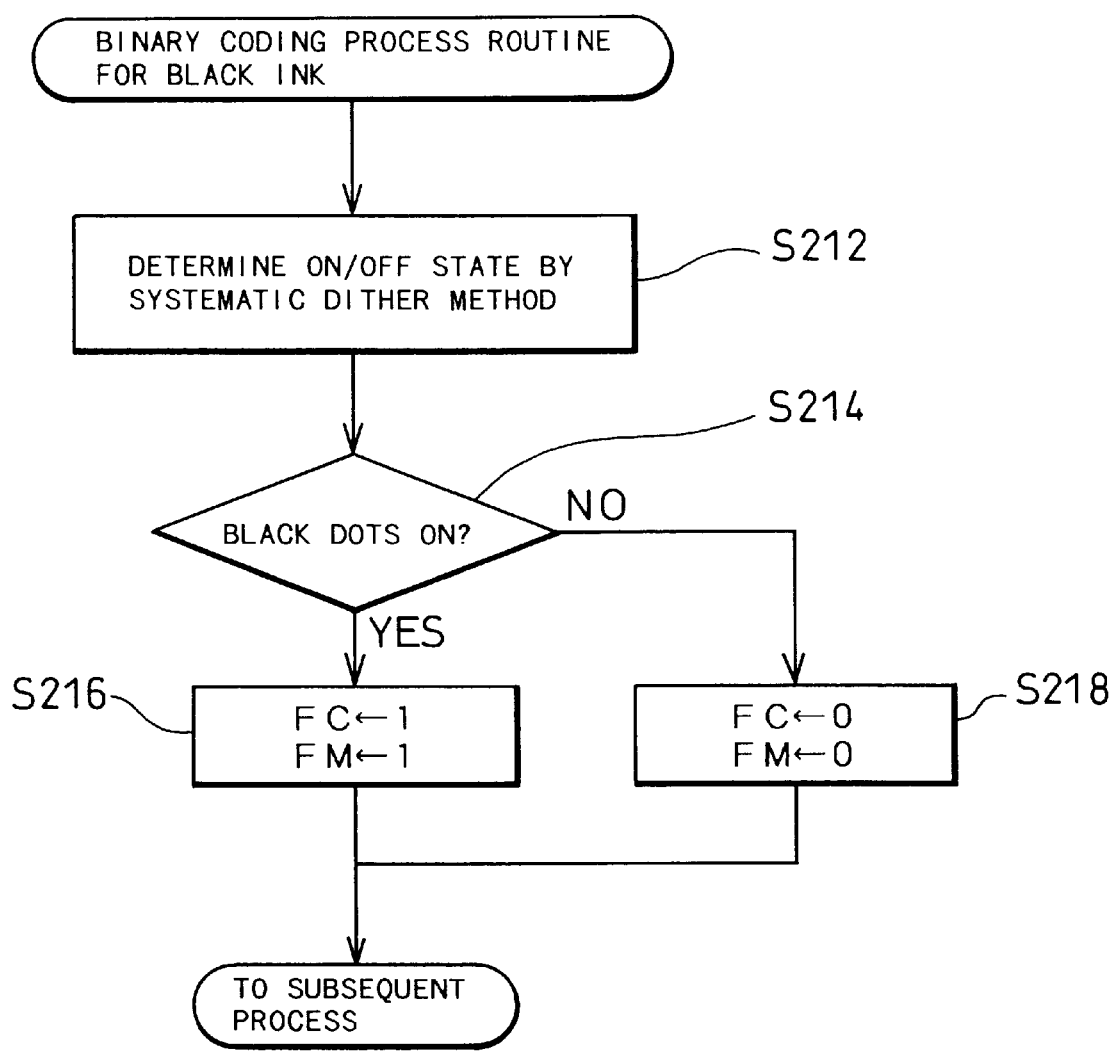
FIG. 20 is a flowchart showing a binary coding process routine for black ink carried out in the first embodiment.

The systematic dither method, which is discussed above in the fundamental technique, is adopted to the binary coding for the black ink K as shown in the flowchart of FIG. 20. A wide-range matrix of 64×64 in size (blue noise matrix) is used to realize binarization with favorable dispersibility for the black ink K. After binarization for the black ink K at step S212, that is, determination of the on/off state of dots formed by the black ink K, it is determined whether or not black dots are ON at step S214. In the on state, that is, in case of formation of dots by the black ink K, the value '1' is set to both flags FC and FM at step S216. In the OFF state, that is, in case of no formation of dots by the black ink K, on the other hand, the value '0' is set to both the flags FC and FM at step S218. These flags FC and FM representing the on/off state of dots by black ink are referred to in the binary coding process for cyan ink and magenta ink (steps S220 and 230).

Figure 21:
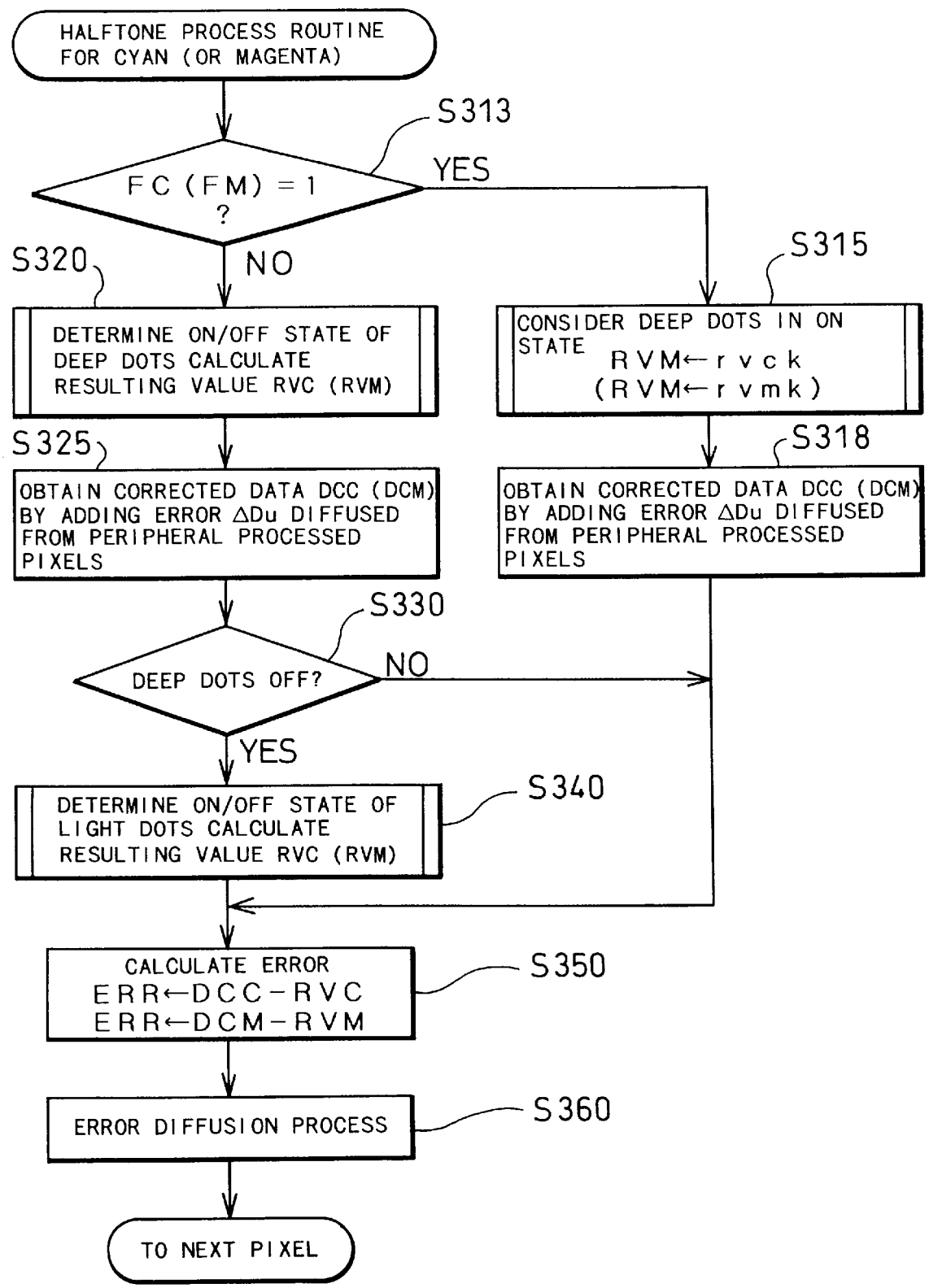
FIG. 21 is a flowchart showing a halftone process routine for cyan (or magenta) carried out in the first embodiment.

The flowchart of FIG. 21 shows details of the halftone process for cyan ink and magenta ink executed at steps S220 and S230. The halftone process for cyan or magenta includes similar steps to those of the halftone processing discussed above as the fundamental technique and shown in the flowchart of FIG. 11. Steps of FIG. 21 identical with or similar to those of FIG. 11 have like numerals in the lower two places. The flowchart of FIG. 21 mainly relates to the processing for cyan ink, and that for magenta ink is shown in parentheses. When the program enters the routine of FIG. 21, it is first determined at step S313 whether or not the flag FC is equal to one. In the processing routine for magenta ink, it is here determined whether or not the flag FM is equal to one. In case that the flag FC (or FM) is not equal to one, the program recognizes the off state of dots by the black ink K, which has been set in the binary coding process for black ink shown in the flowchart of FIG. 20. The program then determines the on/off state of deep dots (the cyan ink C1 or the magenta ink M1) and calculates a resulting value RVC (RVM) at step S320. At subsequent step S325, corrected data DCC for cyan (DCM for magenta) is obtained by adding an error ΔDu diffused from the processed pixels, which are in proximity to a target pixel.

In case that the flags FC and FM are equal to one, on the contrary, the program recognizes the on state of dots by the black ink K, which has been set in the binary coding process for black ink. The program then considers deep dots formed by the cyan ink C1 (magenta ink M1) to be also in the on state irrespective of the input tone data, and calculates the resulting value RVC (RVM) at step S315. When dots are formed by the black ink K, it can be thought that cyan and magenta exist in black ink according to the concept of subtractive mixture of color stimuli. There is accordingly no necessity of newly forming dots of cyan or magenta ink upon dots of black ink. The program thus considers dots by the cyan ink C1 and magenta ink M1 to be also in the on state and sets a predetermined value rvck (rvmk) to the resulting value RVC (RVM) at step S315. The program then proceeds to step S318, like step S325, at which corrected data DCC for cyan (DCM for magenta) is obtained by adding an error ΔDu diffused from the processed pixels, which are in proximity to a target pixel.

In case of no formation of dots by the black ink K (when FC=FM=0), after obtaining the corrected data DCC (DCM), the program determines at step S330 whether or not deep dots are in the on state (that is, whether or not dots are formed by the cyan ink C1 or the magenta ink M1). In case that no deep dots are formed, the program determines the on/off state of low-density dots (hereinafter referred to as light dots), that is, dots formed by the light cyan ink C2 (or the light magenta ink M2), at step S340. The process of determining the on/off state of light dots follows the fundamental technique discussed above with the flowchart of FIG. 16. In this embodiment, the error diffusion method is adopted to determine formation of light dots by the light cyan ink C2 (or the light magenta ink M2). In accordance with a concrete procedure, the tone data DCC (DCM) corrected according to the concept of error diffusion is compared with a threshold value Dref2 for light dots. The threshold value Dref2 is a reference value for determining whether or not dots should be formed by the lower-density, light ink in a target pixel.

In case that the corrected data DCC (DCM) is greater than the threshold value Dref2, the program determines the on state of light dots and calculates a resulting value RVC (RVM), which corresponds to an evaluation value of light dots. In case that the corrected data DCC (DCM) is not greater than the threshold value Dref2, on the other hand, the program determines the off state of light dots and sets the value '0' to the resulting value RVC (RVM).

Referring back to the flowchart of FIG. 21, after determining the on/off state of light dots and calculating the resulting value RVC (RVM) at step S340, the program proceeds to step S350 to calculate an error ERR. The error ERR is obtained by subtracting the resulting value RVC (RVM) from the corrected data DCC (DCM). In case that neither deep dots nor light dots are formed, the resulting value RVC (RVM) is equal to zero and the corrected data DCC (DCM) is set to the error ERR. In this case, no density to be realized is obtained in the target pixel, so that the density is specified as the error ERR. In case that either deep dots or light dots are formed, on the other hand, a value corresponding to the created dots is set to the resulting value RVC (RVM), so that the difference between the corrected data DCC (DCM) and the resulting value RVC (RVM) is specified as the error ERR. When dots are formed by black ink, the structure of the embodiment calculates the resulting value RVC (RVM) and obtains the corrected data DCC (DCM) on the assumption that deep dots of cyan and magenta are in the on state, prior to the processing of and after step S350. In case that dots are formed by black ink in a target pixel, the structure of the embodiment does not form dots of cyan or magenta ink therein, but sets the predetermined value rvck (rvmk) to the resulting value RVC (RVM), prior to calculation of the error (step S350).

It is desirable to set the resulting value, which is used for calculation of the error, based on the degree of correlation of hues between the ink color of dots having the on/off state determined first and the ink color of dots having the on/off state determined later. In the above example, the ink color having the on/off state determined first is black, whereas the ink color having the on/off state determined later is either cyan or magenta. In this case, formation of black dots enables the resulting value RVC (RVM) to be set on the assumption that dots of the cyan ink C are in the on state. As another example, the ink color having the on/off state determined first is cyan, whereas the ink color having the on/off state determined in relation to the on/off state of cyan dots is either magenta or yellow. Under such conditions, there is a little correlation between hues of the first ink color and the latter ink color. When the first ink color is in the on state and the latter ink color is in the off state, a smaller value is set to the resulting value for the latter. The user can experimentally determine the magnitude of the resulting value for each pair of ink colors by evaluating the quality of resulting printed images.

After the calculation of the error, the program proceeds to step S360 for error diffusion. The error ERR obtained at step S350 is distributed into peripheral pixels around the target pixel with predetermined weights (see FIG. 15). After the error diffusion process, the program goes to a next pixel and repeats the processing of steps S313 through S360 for the next pixel. The subsequent binary coding process for yellow ink (step S240) is different from the binary coding process for cyan and magenta inks (steps S220 and S230) and is based on the systematic dither method. The binary coding process for yellow ink utilizes the same threshold matrix as that used in the binary coding process for black ink. In case that dots are formed by black ink, no dots should be formed by yellow ink.

In the process of recording a multi-color image with a plurality of inks including black ink, when dots are formed by one ink (black ink), the structure of the first embodiment considers dots to be also formed by other inks (cyan ink and magenta ink) having different hues and does not newly form dots of cyan and magenta in a target pixel. In case that dots are formed by black ink, the structure of the embodiment calculates the resulting values RVC and RVM for cyan ink and magenta ink on the assumption that dots are also formed by cyan ink and magenta ink. In the on state of dots by black ink, dots of cyan and magenta are not generally observed in the vicinity of the black dots. In an area where the respective color inks are sparsely recorded, for example, it is rather difficult to record dots by cyan ink and magenta ink as well as dots by light cyan ink and light magenta ink in the vicinity of dots by black ink. This favorably improves granularity of resulting images. The structure of the embodiment prevents inks from being discharged wastefully, thereby reducing the total amount of inks consumed. This is favorable from the aspect of restricted amount of ink sprayed against the sheet of paper (ink duty).

Although the above embodiment regards the relationship between black ink and cyan and magenta inks, the principle of the embodiment is not restricted to cyan or magenta inks but is applicable to any chromatic color inks, such as yellow ink. The principle of the embodiment is also applicable to another combination of inks discharged from the head, instead of the combination of CYM. The achromatic color ink may be a lower-density ink, such as gray ink, other than black ink used in the above embodiment.

The following describes a second embodiment according to the present invention. The second embodiment takes cyan and magenta as two color inks of different hues, for which formation of dots are correlated to each other. The halftone process carried out in the second embodiment follows the flowcharts of FIGS. 22 through 24. When the program enters the routine of FIG. 22, the position of a target pixel is initialized at step S400. A concrete procedure sets the value '0' to both variables x and y, wherein x and y respectively represent the position in the horizontal direction and the position in the vertical direction. The program then proceeds to step S410 to carry out N-valued coding for magenta ink M based on tone data or density M(x,y) of the magenta ink M in the target pixel and calculate a resulting value MRST. A variety of techniques are applicable here to execute N-valued coding for magenta ink. For example, the N-valued coding may be based on the systematic dither method, which is applied to black ink in the first embodiment.

Figure 23:
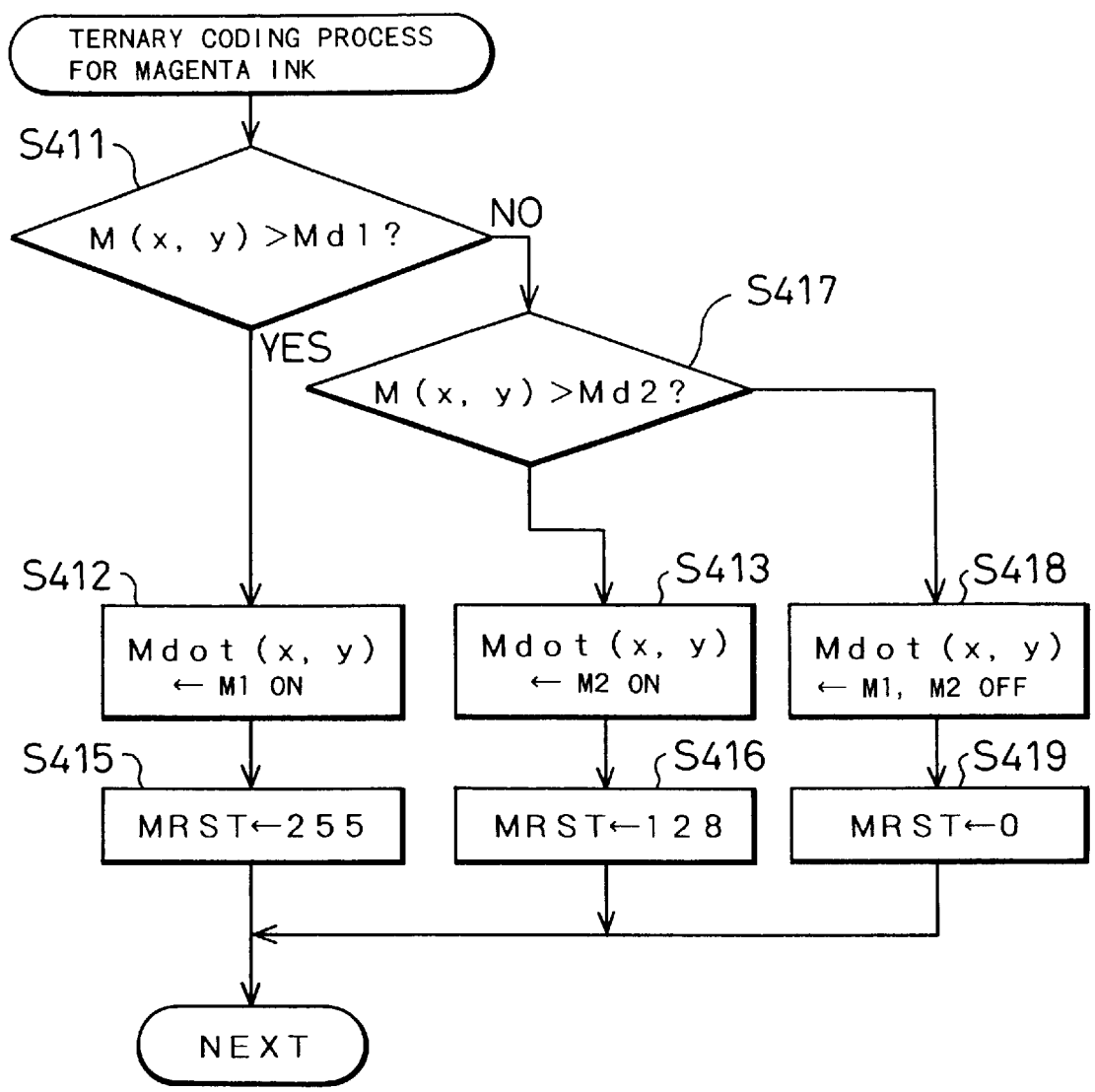
FIG. 23 is a flowchart showing a ternary coding process for magenta ink carried out in the second embodiment.

There are two types of magenta inks, that is, the higher-density magenta ink M1 and the lower-density light magenta ink M2, so that the N-valued coding may be ternary coding. The flowchart of FIG. 23 shows the ternary coding process according to the systematic dither method. A threshold matrix of 16×16 discrete dither is prepared in advance for the ternary coding. Threshold values in the range of 85 to 255 are stored in the threshold matrix of discrete dither with good dispersibility. The density M(x,y) of magenta ink is compared with a threshold value Md1 read from the threshold matrix at step S411. In case that the density M(x,y) is greater than the threshold value Md1, the program determines formation of dots by the magenta ink M1 and sets the magenta ink M1 in the on state for the target pixel Mdot(x,y) at step S412. In case that the density M(x,y) of magenta ink is not greater than the threshold value Md1, on the other hand, the program proceeds to step S417, at which the density M(x,y) is further compared with a lighter dot threshold value Md2, which is obtained by subtracting the value 85 from the threshold value Md1. When the density M(x,y) of magenta ink is greater than the lighter dot threshold value Md2, the program determines formation of dots by the light magenta ink M2 and sets the light magenta ink M2 in the on state for the pixel Mdot(x,y) at step S413. When the density M(x,y) of magenta ink is not greater than the lighter dot threshold value Md2, on the contrary, the program proceeds to step S418 to set both the magenta ink M1 and the light magenta ink M2 in the off state for the pixel Mdot(x,y). A resulting value MRST for magenta ink depends upon formation or non-formation of the respective dots. The resulting value MRST is set equal to 255 in the case of formation of dots by the magenta ink M1 (step S415), is set equal to 128 in the case of formation of dots by the light magenta ink M2 (step S416), and is set equal to zero in the case of no formation of dots by any inks (step S419).

Figure 22:
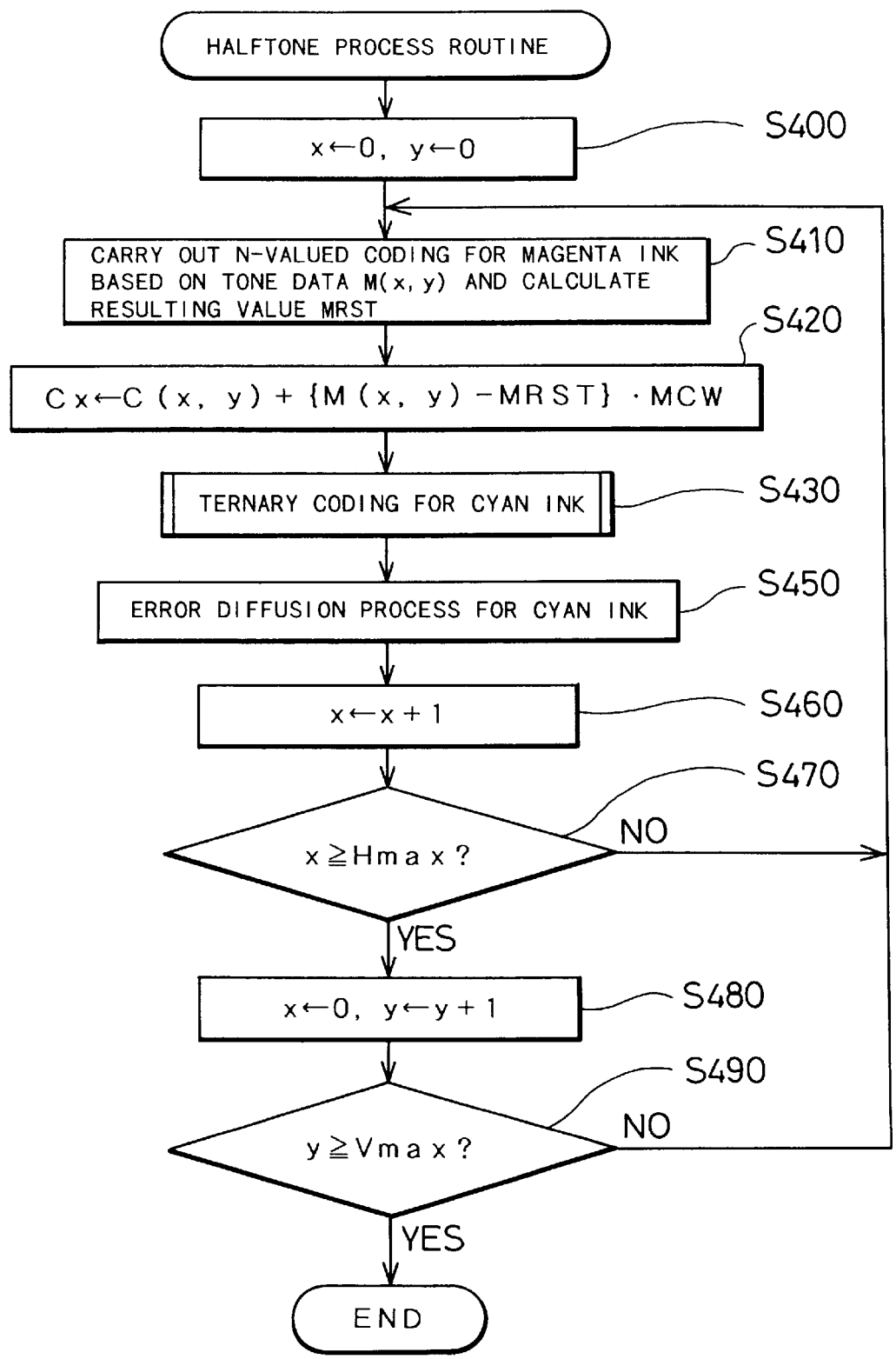
FIG. 22 is a flowchart showing a halftone process routine executed in a second embodiment according to the present invention.

Referring back to the flowchart of FIG. 22, after the ternary coding process for magenta ink, the program obtains modified data Cx for cyan ink at step S420. The modified data Cx is obtained by adding the product of the difference between the tone data M(x,y) of magenta ink and its resulting value MRST and a weighting coefficient MCW to tone data C(x,y) of the cyan component in the target pixel. This is expressed as:

$$Cx = C(x,y) + \{M(x,y) - MRST\} \cdot MCW$$

The difference between the tone data of magenta ink and its resulting value is used to specify the modified data Cx for the cyan component. This makes it difficult to form does of cyan ink in the place where dots have already been formed by magenta ink, that is, in the place having a minus value for M(x,y)-MRST. The weighting coefficient MCW, which is used to determine the modified data Cx, functions to adjust the degree of difficulty in forming dots of cyan ink upon the dots of magenta ink. When the weighting coefficient MCW is smaller than one, the correlation between dots of cyan ink and dots of magenta ink is relatively strong on the average. When the weighting coefficient MCW is greater than one, on the contrary, the correlation of dots is relatively weak on the average.

Figure 24:
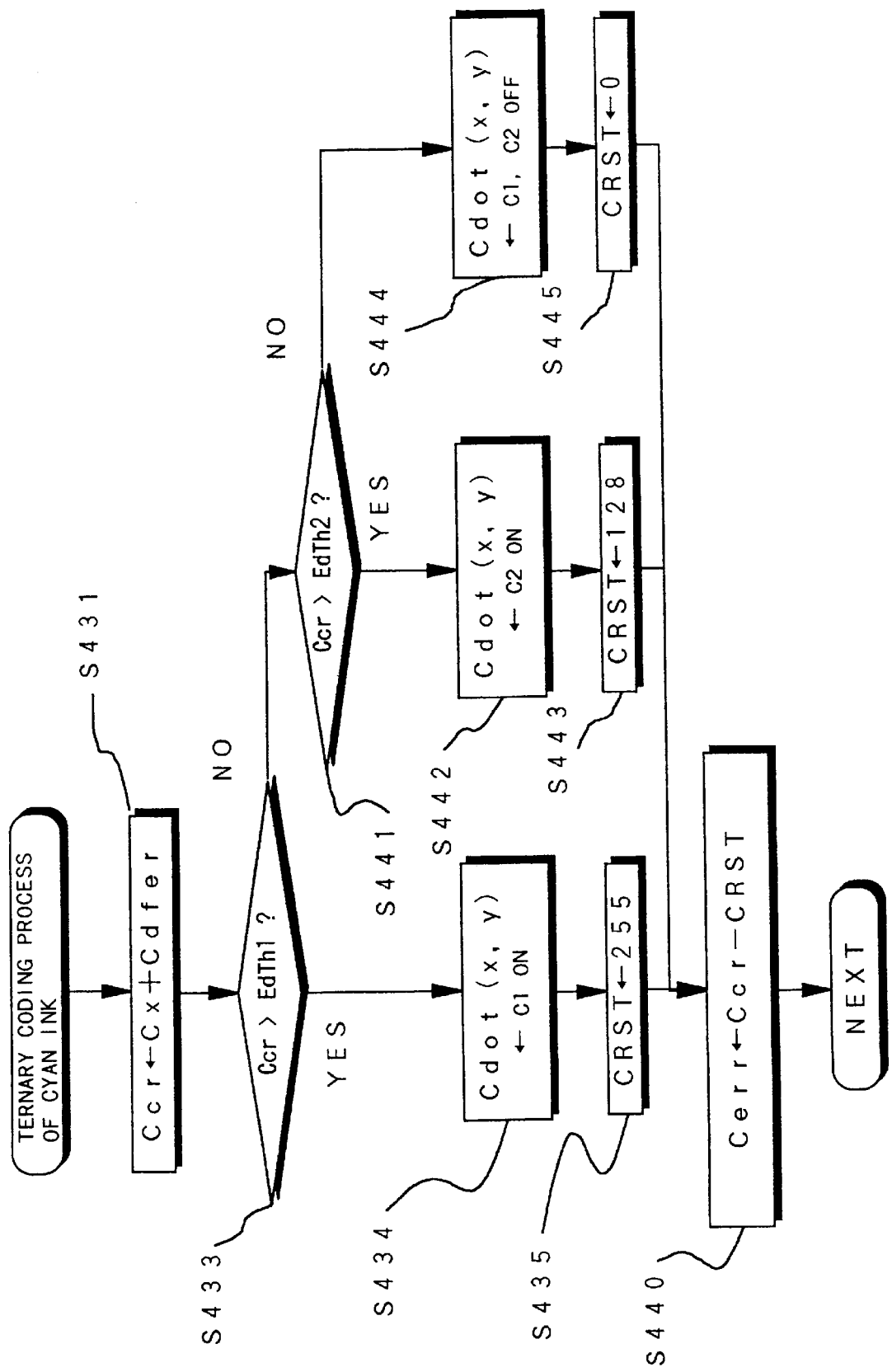
FIG. 24 is a flowchart showing a ternary coding process for cyan ink carried out in the second embodiment.

After correcting the tone data regarding the cyan component at step S420, the program carries out ternary coding for cyan ink at step S430. The flowchart of FIG. 24 shows details of the ternary coding process for cyan ink. In brief, the on/off state of dots by the cyan ink C1 and the light cyan ink C2 is determined, based on diffusion error-corrected data Ccr for the cyan component. This ternary coding process will be discussed after the general procedure shown in the flowchart of FIG. 22.

After the ternary coding for the cyan component at step S430, an error occurring for the cyan component is diffused into the peripheral pixels at step S450. The ternary coding process results in formation of dots by the higher-density cyan ink C1, formation of dots by the lower-density light cyan ink C2, or no formation of dots. In any case, there generally exists an error from the original tone data regarding the target pixel. The error is distributed into the peripheral pixels with some weights specified in FIG. 15.

The program then proceeds to step S460 to increment the variable x representing the position in the primary scanning direction (moving direction of the head) by one, and subsequently to step S470 to determine whether or not the variable x representing the position in the primary scanning direction exceeds an end Hmax in the primary scanning direction. In case that the variable x does not exceed the end Hmax in the primary scanning direction, the program returns to step S410 and repeats the processing of steps S410 through S470. In case that the variable x exceeds the end Hmax in the primary scanning direction, on the contrary, the program proceeds to step S480 to initialize the variable x to zero and increment the variable y representing the position in the secondary scanning direction (feeding direction of sheet of paper) by one. At subsequent: step S490, it is determined whether or not the variable y representing the position in the secondary scanning direction exceeds an end Vmax of the sheet of paper. When the variable y does not exceed the end Vmax, the program returns to step S410 and repeats the-processing of steps S410 through S490.

Referring to FIG. 24, the ternary coding process for the cyan component is discussed. When the program enters the routine of FIG. 24, corrected data Ccr for the cyan component is obtained at step S431 by adding a diffused error Cdfer processed at step S450 to the modified data Cx obtained at step S420 in the flowchart of FIG. 22. As discussed above, the modified data Cx is obtained by adding the difference between the tone data for magenta ink and its resulting value, which is then multiplied by a predetermined weight, to the tone data C(x,y) for the cyan component in the target pixel. The corrected data Ccr is given by adding the error diffused from the peripheral pixels to the modified data Cx and thereby represents the density of cyan ink to be realized in the target pixel. At subsequent step S433, the corrected data Ccr is compared with a first threshold value EdTh1. In case that the corrected data Ccr is greater than the first threshold value EdTh1, the program determines formation of deep dots and sets the cyan ink C1 in the on state for the target pixel Cdot(x,y) at step S434, in order to realize the high density in the target pixel. In the on state of deep dots, a resulting value CRST for cyan ink is set equal to 255 at step S435. The program then goes to step S440 to specify the difference between the corrected data Ccr and the resulting value CRST as a density error Cerr. The density error Cerr is a quantized error diffused into the peripheral pixels according to the error diffusion process, which is carried out at step S450 in the flowchart of FIG. 22.

In case that the corrected data Ccr is determined to be not greater than the first threshold value EdTh1 at step S433, on the other hand, the program further compares the corrected data Ccr with a second threshold value EdTh2, which is smaller than the first threshold value EdTh1, at step S441. When the corrected data Ccr is not greater than the first threshold value EdTh1 but is greater than the second threshold value EdTh2, the program determines formation of light dots, in order to realize the required density in the target pixel. The concrete procedure sets the light cyan ink C2 in the on state for the pixel Cdot(x,y) at step S442. In the on state of light dots, the resulting value CRST is set equal to 128 at step S443. In case that the corrected data Ccr is determined to be not greater than the second threshold value EdTh2 at step S441, the program determines no formation of either deep dots or light dots and sets both the cyan ink C1 and the light cyan ink C2 in the off state for the pixel Cdot(x,y) at step S444. In the off state of both deep dots and light dots, the resulting value CRST is set equal to zero at step S445.

In this manner, the ternary coding process for the cyan component determines formation of deep dots C1, formation of light dots C2, or no formation of any dots. After determining formation or non-formation of deep dots and light dots (steps S434, S442, and S444) and setting the resulting value CRST (steps S435, S443, and S445), the program calculates the density error at step S440.

In the second embodiment discussed above, formation or non-formation of dots by magenta ink affects formation of deep dots and light dots by cyan ink. Formation of dots by magenta ink makes it difficult to form dots by cyan ink, which has a different hue from that of magenta ink, in the vicinity of the magenta dots. Even when magenta ink and cyan ink independently have high dispersibility, the structure of the second embodiment effectively prevents dots of cyan ink from being adjacent to dots of magenta ink, thereby improving granularity.

The structure of the embodiment takes the effect of formation of dots by magenta ink as the difference between the density M(x,y) to be realized by magenta ink and the resulting value MRST of magenta dots, that is, M(x,y)-MRST. This favorably localizes the effect of magenta ink. Magenta ink and cyan ink are completely different from each other in the aspect of hue, and it is thus impossible to consider that the hue of one ink includes the hue of the other ink, like the combination of magenta ink and black ink. The procedure of restricting the effect of one ink on the other ink to a certain range and allowing substantially no effect on the whole image results in desirable reproduction of the tone and lightness of the whole image. The technique of the second embodiment is applicable to the case in which the sum of magenta ink and cyan ink exceeds 100%.

In the second embodiment, the ternary coding process is carried out for both the magenta ink and cyan ink. Formation of dots by magenta ink makes it difficult to form dots by cyan ink in the vicinity of the magenta dots, according to the density of the magenta dots. Both the cyan ink and magenta ink have a lower-density ink and a higher-density ink. Even if cyan dots are formed in the vicinity of magenta dots, this allows formation of only lower-density dots. This ensures the extremely high quality of images.

In the second embodiment discussed above, the difference between the density M(x,y) of magenta ink and its resulting value MRST is taken as the effect of formation of magenta dots on formation of cyan dots at step S420 in the flowchart of FIG. 22. This structure localizes the effect of magenta ink and does not extend the effect to the mean density of cyan ink. The effect of formation of dots by magenta ink upon formation of dots by cyan ink is regulated by the weighting coefficient MCW. When the two inks having different hues are the combination of black ink and magenta ink, the combination of black ink and cyan ink, or the combination of black ink, magenta ink, and cyan ink, the weighting coefficient should be adjusted to an optimum value with respect to each combination. In the combination of black ink and magenta ink (or black ink and cyan ink), the optimum value is approximately equal to 1. In case that black ink affects both magenta ink and cyan ink, the optimum value ranges from 0.5 to 0.8. When replacement of both cyan and magenta dots by one black dot makes the space between dots conspicuous, it is desirable to set the weighting coefficient to be not greater than 0.5.

In the second embodiment, at step S420 in the flowchart of FIG. 22, the local effect of formation of magenta dots is defined as M(x,y)-MRST·MCW. This totally corrects the effect of local error by the weighting coefficient MCW. Another possible procedure may, however, multiply the density M(x,y) of magenta ink and its resulting value MRST by different weighting coefficients as given below, so as to independently evaluate the effect of the density of magenta ink in the pixel and the effect of the density of dots actually formed in the pixel:

$$M(x,y) \cdot MCW1 - MRST \cdot MCW2$$

In accordance with still another possible procedure, the degree of effect of the density of ink that has been previously subjected to the multi-valued coding (magenta ink in this embodiment), which is referred to as the first degree of effect, is given as:

$$Cx \leftarrow C(x,y)+M(x,y) \cdot MCW1$$

The mean error minimizing method is then adopted to evaluate the degree of effect of the diffused error from the peripheral pixels, which is referred to as the third degree of effect and expressed by:

$$Ccr \leftarrow Cx+Cdfer$$

The degree of effect of the density of dots actually formed by the ink that has been previously subjected to the multi-valued coding, which is referred to as the second degree of effect, is defined as:

$$C \leftarrow Ccr-MRST \cdot MCW2$$

This procedure carries out multi-valued coding for the second ink of different hue (cyan ink in this embodiment) based on the tone data C thus obtained. Correction by these degrees of effects may be carried out in any sequence.

In the case of correlation between black ink and cyan ink (or magenta ink), the equation used at step S420 in the flowchart of FIG. 22 may be replaced by the equation of:

$$Cx=C(x,y)+K(x,y)$$

In this case, in the ternary coding process for the cyan ink, it is determined whether or not dots have been formed by the black ink K, immediately after the calculation of the corrected data Ccr. In case that dots have been formed by the black ink K, the program may determine no formation of dots by cyan ink and set a predetermined value (for example, 255) to the resulting value CRST for the cyan ink, because of the following reason.

At step S420 in this modified routine, the modified data Cx for cyan ink is obtained by adding the tone data K(x,y) of black ink to the tone data C(x,y) of cyan ink. The corrected data Ccr calculated at step S431 in the flowchart of FIG. 24 is accordingly given by:

$$Ccr=Cx+Cdfer=C(x,y)+K(x,y)+Cdfer$$

In the case of formation of dots by black ink, the density error Cerr obtained by subtracting the resulting value CRST for cyan ink from the corrected data Ccr is thus given by:

$$Cerr=Ccr-CRST=C(x,y)+K(x,y)-CRST+Cdfer$$

When dots have been formed by black ink, the procedure sets a predetermined value to the resulting value CRST for cyan ink, without determining formation or non-formation of dots by cyan ink. The resulting value CRST is accordingly reflected by the resulting value of dots formed by black ink. This is expressed by:

$$K(x,y) \ CRST=Kerr$$

In the case of formation of dots by black ink, the corresponding error Kerr affects formation of peripheral dots by cyan ink at step S450 in the flowchart of FIG. 22. In the case of no formation of dots by black ink, on the other hand, the resulting value KRST for black ink is generally set equal to zero. Addition of the tone data K(x,y) of black ink at step S420 in the modified routine accordingly corresponds to addition of the density error Kerr regarding the black ink. Namely the on/off state of dots by black ink affects the on/off state of peripheral dots by cyan ink. This idea can be applied to the case in which formation of dots by magenta ink affects formation of dots by cyan ink.

The above embodiment regards the combination of black ink and cyan (or magenta)ink and the combination of magenta ink and cyan ink, in order to discuss the effect of formation of dots by one ink upon formation of dots by another ink having a different hue. The principle of the present invention is, however, applicable to other combinations of inks, such as cyan (or magenta) ink and yellow ink, cyan (or magenta) ink and light magenta (or light cyan) ink, and light cyan (or light magenta) ink and yellow ink. The principle of the present invention is also applicable to the effect of black-containing achromatic color ink, such as gray ink, on a chromatic color ink, such as magenta or cyan.

In the above embodiments, the programs for controlling formation of dots are stored in the printer driver 96 included in the computer 90. These programs may, however, be stored in the printer 20. For example, in case that the computer 90 sends image information written in a language, such as PostScript, the printer 20 has a halftone module and other required elements. In the embodiments, the software realizing these functions is stored in a hard disk of the computer 90 and incorporated into the operating system in the form of the printer driver at the time of activation of the computer 90. In accordance with another possible application, the software may be stored in portable storage media (carriable storage media), such as floppy disks and CD-ROMs, and transferred from the portable storage media to the main memory of the computer system or an external storage device. The software may be transferred from the computer 90 to the printer 20. Still another possible application utilizes an apparatus for supplying the software via a communication line. In this structure, the contents of the halftone module may be transferred to either the computer 90 or the printer 20 via the communication line.

Figure 25:
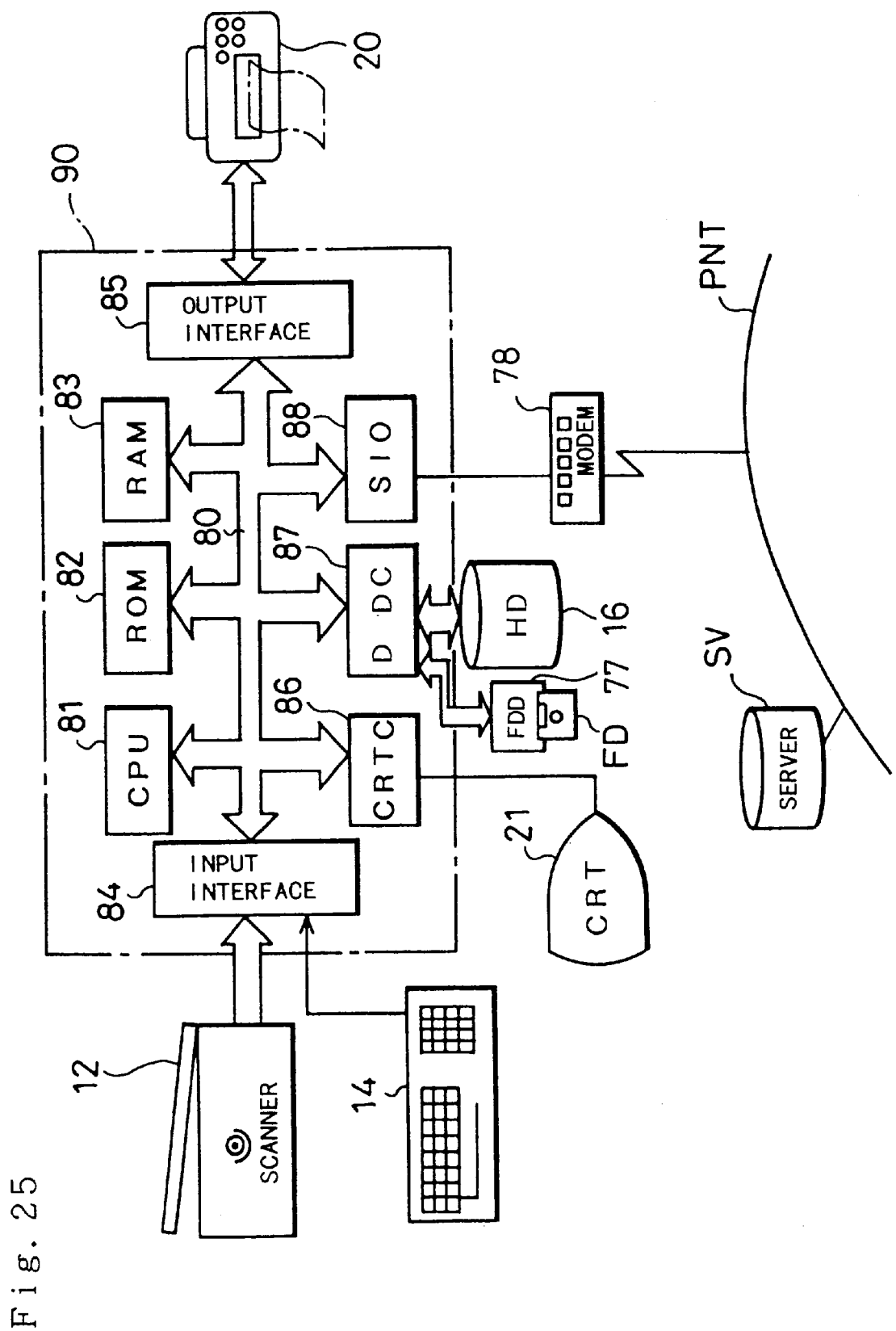
FIG. 25 illustrates internal structure of the computer 90 and connection of the computer 90 to a network system.
Figure 26A:
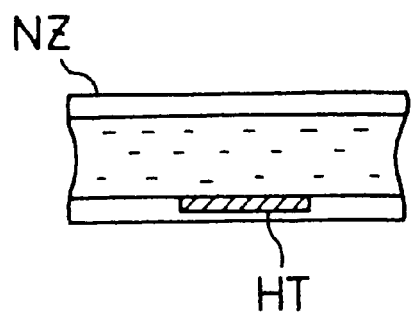
FIGS. 26A through 26E show another mechanism for discharging ink particles.
Figure 26B:
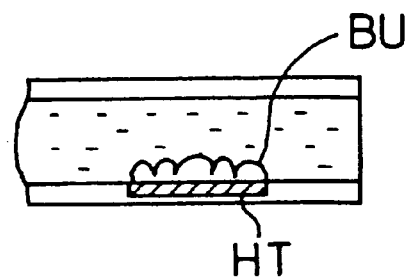
Figure 26C:
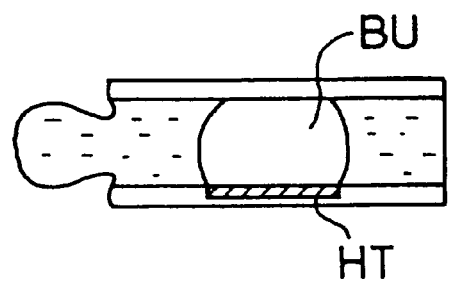
Figure 26D:
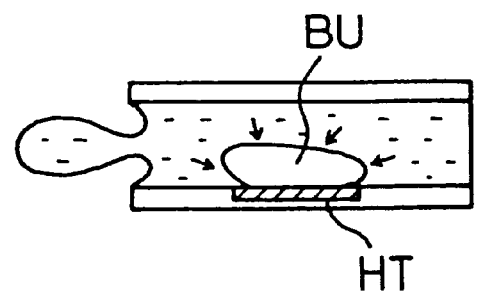
Figure 26E:
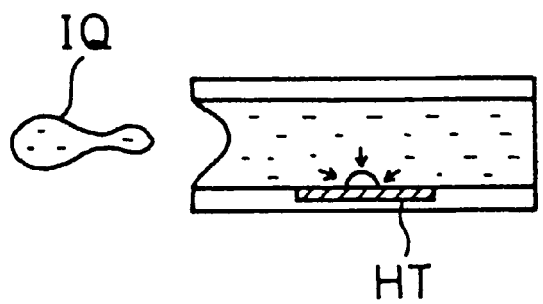

The computer 90 may have an internal structure as shown in the block diagram of FIG. 25. The computer 90 includes a CPU 81 for executing a variety of arithmetic and logic operations according to programs in order to control the actions related to image processing, and other peripheral units mutually connected to one another via a bus 80. A ROM 82 stores programs and data required for execution of the variety of arithmetic and logic operations by the CPU 81. A RAM 83 is a memory, which various programs and data required for execution of the variety of arithmetic and logic operations by the CPU 81 are temporarily read from and written in. An input interface 84 receives input signals from a scanner 12 and a keyboard 74, whereas an output interface 85 sends output data to the printer 20. A CRTC 86 controls signal outputs to a CRT 21 that can display color images. A disk controller (DDC) 87 controls transmission of data from and to a hard disk 76, a flexible disk drive 77, and a CD-ROM drive (not shown). The hard disk 76 stores a variety of programs that are loaded into the RAM 83 and executed, as well as other programs that are supplied in the form of a device driver. A serial input-output interface (SIO) 88 is also connected to the bus 80. The SIO 88 is connected to a public telephone network PNT via a modem 78. The computer 90 is connected with an external network via the SIO 88 and the modem 78, and can access a specific server SV in order to download the programs required for image processing into the hard disk 76. The computer 90 may alternatively execute the required programs loaded from a flexible disk FD or a CD-ROM.

The variety of programs executed in the above embodiments may be recorded on the recording media, such as flexible disks and CD-ROMS. The computer 90 reads these programs by means of the disk drive 77, thereby realizing the image recording method discussed above.

In the above embodiments, a predetermined voltage is applied to the piezoelectric elements PE for a predetermined time period, in order to discharge both the low-density ink and the high-density ink. Another method may, however, be applicable to discharge inks. The available ink-discharge techniques can be classified into two types; that is, the method of separating ink particles from a continuous jet stream of ink and the on-demand method applied in the above embodiments. The former type includes a charge modulation method that separates droplets of ink from a jet stream of ink by means of charge modulation and a micro-dot method that utilizes fine satellite particles produced in the process of separating large-diametral particles from a jet stream of ink. These methods are applicable to the printing system of the present invention that utilizes inks of different densities.

The on-demand type, on the other hand, produces ink particles for the respective dot units according to the requirements. An available method of the on-demand type, other than the method utilizing the piezoelectric elements applied in the above embodiments, arranges a heating body HT in the vicinity of nozzles NZ of ink, produces bubbles BU by heating ink, and makes ink particles IQ discharged by the pressure of the bubbles BU as shown in FIGS. 26A through 26E. Such on-demand type methods are applicable to the printing system of the present invention that utilizes inks of different densities or plural types of dots having different diameters. The on-demand method is also applicable to the structure, in which dots of different densities are formed by discharging ink of a specific density by a plurality of times.

The present invention is not restricted to the above embodiments, but there may be many modifications, changes, and alterations without departing from the scope or spirit of the main characteristics of the present invention.

One application of the present invention other than the printing system discussed above is an image display apparatus for displaying images on a CRT. The image display apparatus that can form multi-tone dots is especially useful when the number of tones expressible by the CRT is smaller than the number of tones of an original image. Like in the printing systems of the above embodiments, in the image display apparatus, first dot formation determination means carries out multi-valued coding with respect to one type of dots selected among at least two types of dots having different hues, and determines formation or non-formation of the selected one type of dots. Second dot formation determination means receives the result of multi-valued coding and enables the result to affect the display density to be realized by another type of dots having a different hue. The second dot formation determination means carries out multi-valued coding with respect to the another type of dots according to the affected display density, and determines formation or non-formation of the another type of dots. Dot formation means then actually forms the at least two types of dots having different hues, based on the results of determination by the first dot formation determination means and the second dot formation determination means.

In such an image display apparatus, the effect of formation of dots having one hue can reflect formation of dots having another hue. This allows display of high-quality images having improved granularity.

It should be clearly understood that the above embodiments are only illustrative and not restrictive in any sense. The scope and spirit of the present invention are limited only by the terms of the appended claims.

What is claimed is:

1. A printing system with a head for forming at least two types of dots having different hues on an object, said printing system recording a multi-tone image through a distribution of said dots, said printing system comprising:

input means for successively inputting multi-color tone signals regarding pixels included in an image to be printed;

first dot formation determination means for carrying out multi-valued coding with respect to one type of dots selected among said at least two types of dots having different hues, based on said input tone signal of a color corresponding to said one type of dots, and determining either one of formation and non-formation of said one type of dots;

second dot formation determination means for enabling the result of multi-valued coding carried out by said first dot formation determination means to affect a recording density to be realized by another type of dots having a different hue, carrying out multi-valued coding with respect to said another type of dots according to said recording density, and determining either one of formation and non-formation of said another type of dots; and head drive means for driving said head based on the results of determination by said first dot formation determination means and said second dot formation determination means, thereby actually forming said at least two types of dots having different hues.

2. A printing system in accordance with claim 1, wherein said one type of dots selected among said at least two types of dots having different hues and processed by said first dot formation determination means are dots of a color having a greater visual effect.

3. A printing system in accordance with claim 1, wherein said one type of dots selected among said at least two types of dots having different hues are dots of one color component included in three primary colors that can express a full color, whereas said another type of dots having a different hue are dots of another color component included in said three primary colors.

4. A printing system in accordance with claim 1, wherein said one type of dots selected among said at least two types of dots having different hues are dots of one color component included in three primary colors that can express a full color, whereas said another type of dots having a different hue are dots of a color including said one color component and another color component.

5. A printing system in accordance with claim 1, wherein said first dot formation determination means comprises means for determining either one of formation and non-formation of said one type of dots, which has been selected among said at least two types of dots having different hues, based on said input tone signal of a color corresponding to said one type of dots, prior to said determination with respect to said another type of dots having a different hue, said second dot formation determination means comprising means for determining either one of formation and non-formation of said another type of dots having a different hue, when said first dot formation determination means determines non-formation of said one type of dots.

6. A printing system in accordance with either one of claim 5, said printing system further comprising error diffusion means for calculating a difference between a first printing density, which corresponds to said input tone signal relating to said another type of dots and regarding a target pixel, and a second printing density, which is realized by said another type of dots in said target pixel, as a density error, based on said determination of either one of formation and non-formation of said another type of dots by said second dot formation determination means, and distributing said density error into peripheral pixels that are in proximity to said target pixel, in order to enable said density error to affect said determination of either one of formation and non-formation of said another type of dots by said second dot formation determination means with respect to said peripheral pixels.

7. A printing system in accordance with claim 6, wherein said error diffusion means comprises density difference calculation means for, when said first dot formation determination means determines formation of said one type of dots, calculating said difference between said first printing density corresponding to said input tone signal relating to said another type of dots and said second printing density realized by said another type of dots, as a value representing a degree of correlation of hues between said one type of dots and said another type of dots.

8. A printing system in accordance with claim 1, wherein said first dot formation determination means comprises means for determining either one of formation and non-formation of said one type of dots, which has been selected among said at least two types of dots having different hues, based on said input tone signal of a color corresponding to said one type of dots, prior to said determination with respect to said another type of dots having a different hue, said second dot formation determination means comprising means for determining non-formation of said another type of dots having a different hue, when said first dot formation determination means determines formation of said one type of dots.

9. A printing system in accordance with either one of claim 8, said printing system further comprising error diffusion means for calculating a difference between a first printing density, which corresponds to said input tone signal relating to said another type of dots and regarding a target pixel, and a second printing density, which is realized by said another type of dots in said target pixel, as a density error, based on said determination of either one of formation and non-formation of said another type of dots by said second dot formation determination means, and distributing said density error into peripheral pixels that are in proximity to said target pixel, in order to enable said density error to affect said determination of either one of formation and non-formation of said another type of dots by said second dot formation determination means with respect to said peripheral pixels.

10. A printing system in accordance with claim 9, wherein said error diffusion means comprises density difference calculation means for, when said first dot formation determination means determines formation of said one type of dots, calculating said difference between said first printing density corresponding to said input tone signal relating to said another type of dots and said second printing density realized by said another type of dots, as a value representing a degree of correlation of hues between said one type of dots and said another type of dots.

11. A printing system in accordance with claim 1, wherein either one of said first dot formation determination means and said second dot formation determination means applies a dither method to determine either one of formation and non-formation of dots.

12. A printing system in accordance with claim 11, wherein said dither method applied by either one of said first dot formation determination means and said second dot formation determination means utilizes a threshold matrix of discrete dither.

13. A printing system in accordance with claim 1, wherein said head is able to discharge at least two types of inks having different densities, with respect to at least two color inks having different hues, at least either one of said first dot formation determination means and said second dot formation determination means carrying out multi-valued coding for each type of dots selected among at least two types of dots having different densities per unit of area and formed by said at least two types of inks having different densities, and determining either one of formation and non-formation of said each type of dots.

14. A printing system in accordance with claim 13, wherein said at least two types of inks having different densities comprise a higher-density ink and a lower-density ink and a dye density of said lower-density ink is approximately one quarter a dye density of said higher-density ink.

15. A printing system in accordance with claim 1, wherein said head comprises a mechanism for discharging ink particles under a pressure applied to each ink running through an ink conduit by application of a voltage to a piezoelectric element arranged in said ink conduit.

16. A printing system in accordance with claim 1, wherein said head comprises a mechanism for discharging ink particles under a pressure applied to each ink running through an ink conduit by air bubbles that are produced by a supply of electricity to a heating body arranged in said ink conduit.

17. A printing system with a head for forming at least two types of dots having different hues on an object, said printing system recording a multi-tone image through a distribution of said dots, said printing system comprising:

input means for successively inputting multi-color tone signals regarding pixels included in an image to be printed;

first dot formation determination means for carrying out multi-valued coding with respect to one type of dots selected among said at least two types of dots having different hues, based on said input tone signal of a color corresponding to said one type of dots, and determining either one of formation and non-formation of said one type of dots;

local error calculation means for calculating a local difference between a first printing density, which corresponds to said input tone signal relating to said one type of dots and regarding a target pixel, and a second printing density, which is realized by said one type of dots in said target pixel, based on the result of multi-valued coding carried out by said first dot formation determination means;

second dot formation determination means for enabling the local difference to affect a recording density to be realized by another type of dots having a different hue, carrying out multi-valued coding with respect to said another type of dots according to said recording density, and determining either one of formation and non-formation of said another type of dots; and head drive means for driving said head based on the results of determination by said first dot formation determination means and said second dot formation determination means, thereby actually forming said at least two types of dots having different hues.

18. A printing system in accordance with claim 17, wherein said local error calculation means comprises:

first degree of effect calculation means for calculating a first degree of effect of said first printing density, which corresponds to said input tone signal relating to said one type of dots and regarding said target pixel, upon a printing density by said another type of dots having a different hue;

second degree of effect calculation means for calculating a second degree of effect of said second printing density, which is realized by said one type of dots in said target pixel, upon said printing density by said another type of dots having a different hue;

third degree of effect calculation means for calculating a third degree of effect of a density error upon said printing density by said another type of dots having a different hue, based on said determination of either one of formation and non-formation of said another type of dots with respect to peripheral pixels that are in proximity to said target pixel, said density error representing a difference between a printing density corresponding to said input tone signals relating to said another type of dots and regarding said peripheral pixels and a printing density realized by said another type of dots in said peripheral pixels; and means for calculating said local difference by taking into account said first degree of effect, said second degree of effect, and said third degree effect respectively calculated by said first, second and third degree of effect calculation means.

19. A printing system in accordance with claim 17, wherein said one type of dots selected among said at least two types of dots having different hues and processed by said first dot formation determination means are dots of a color having a greater visual effect.

20. A printing system in accordance with claim 17, wherein said one type of dots selected among said at least two types of dots having different hues are dots of one color component included in three primary colors that can express a full color, whereas said another type of dots having a different hue are dots of another color component included in said three primary colors.

21. A printing system in accordance with claim 17, wherein said one type of dots selected among said at least two types of dots having different hues are dots of one color component included in three primary colors that can express a full color, whereas said another type of dots having a different hue are dots of a color including said one color component and another color component.

22. A printing system in accordance with claim 17, said printing system further comprising error diffusion means for calculating a difference between a third printing density, which corresponds to said input tone signal relating to said another type of dots and regarding said target pixel, and a fourth printing density, which is realized by said another type of dots in said target pixel, as a density error, based on said determination of either one of formation and non-formation of said another type of dots by said second dot formation determination means, and distributing said density error into peripheral pixels that are in proximity to said target pixel, in order to enable said density error to affect said determination of either one of formation and non-formation of said another type of dots by said second dot formation determination means with respect to said peripheral pixels.

23. A printing system in accordance with claim 17, wherein either one of said first dot formation determination means and said second dot formation determination means applies a dither method to determine either one of formation and non-formation of dots.

24. A printing system in accordance with claim 23, wherein said dither method applied by either one of said first dot formation determination means and said second dot formation determination means utilizes a threshold matrix of discrete dither.

25. A printing system in accordance with claim 17, wherein said head is able to discharge at least two types of inks having different densities, with respect to at least two color inks having different hues, at least either one of said first dot formation determination means and said second dot formation determination means carrying out multi-valued coding for each type of dots selected among at least two types of dots having different densities per unit of area and formed by said at least two types of inks having different densities, and determining either one of formation and non-formation of said each type of dots.

26. A printing system in accordance with claim 25, wherein said at least two types of inks having different densities comprise a higher-density ink and a lower-density ink and a dye density of said lower-density ink is approximately one quarter a dye density of said higher-density ink.

27. A printing system in accordance with claim 17, wherein said head comprises a mechanism for discharging ink particles under a pressure applied to each ink running through an ink conduit by application of a voltage to a piezoelectric element arranged in said ink conduit.

28. A printing system in accordance with claim 17, wherein said head comprises a mechanism for discharging ink particles under a pressure applied to each ink running through an ink conduit by air bubbles that are produced by a supply of electricity to a heating body arranged in said ink conduit.

29. A printing system with a head for forming at least two types of chromatic color dots of different hues by at least two chromatic color inks as well as achromatic color dots by an achromatic color ink on an object, said printing system recording a multi-tone image through a distribution of said dots, said printing system comprising:

input means for successively inputting tone signals regarding pixels included in an image to be printed;

density calculation means for calculating densities by said at least two chromatic color inks and a density by said achromatic color ink, based on said input tone signals;

achromatic color dot formation determination means for carrying out multi-valued coding with respect to said achromatic color ink based on said density by said achromatic color ink calculated by the density calculation means, and determining either one of formation and non-formation of achromatic color dots by said achromatic color ink;

density correction means for obtaining correction data, which are to reflect the densities by said at least two chromatic color inks, based on the result of multi-valued coding with respect to said achromatic color ink, and correcting the densities by said at least two chromatic color inks;

chromatic color dot formation determination means for carrying out multi-valued coding with respect to said at least two chromatic color dots of different hues, based on said corrected densities by said at least two chromatic color inks, and determining either one of formation and non-formation of said at least two chromatic color dots of different hues; and head drive means for driving said head based on the results of determination by said achromatic color dot formation determination means and said chromatic color dot formation determination means, thereby actually forming said at least two chromatic color dots of different hues by said at least two chromatic color inks as well as said achromatic color dots by said achromatic color ink.

30. A printing system in accordance with claim 29, said printing system further comprising error diffusion means for calculating a difference between a first printing density, which corresponds to said input tone signals relating to said achromatic color dots and said at least two chromatic color dots and regarding a target pixel, and a second printing density, which is realized by said achromatic color dots and said at least two chromatic color dots in said target pixel, as a density error, based on said determination of either one of formation and non-formation of said achromatic color dots by said achromatic color dot formation determination means and of said at least two chromatic color dots by said chromatic color dot formation determination means, and distributing said density error into peripheral pixels that are in proximity to said target pixel, in order to enable said density error to affect said determination of either one of formation and non-formation of said at least two chromatic color dots by said chromatic color dot formation determination means with respect to said peripheral pixels.

31. A printing system in accordance with claim 29, wherein said head comprises a mechanism for discharging ink particles under a pressure applied to each ink running through an ink conduit by application of a voltage to a piezoelectric element arranged in said ink conduit.

32. A printing system in accordance with claim 29, wherein said head comprises a mechanism for discharging ink particles under a pressure applied to each ink running through an ink conduit by air bubbles that are produced by a supply of electricity to a heating body arranged in said ink conduit.

33. A method of controlling a head, which is able to form at least two types of dots having different hues on an object, and recording a multi-tone image through a distribution of said dots, said method comprising the steps of:

(a) successively inputting multi-color tone signals regarding pixels included in an image to be printed;

(b) carrying out multi-valued coding with respect to one type of dots selected among said at least two types of dots having different hues, based on said input tone signal of a color corresponding to said one type of dots, and determining either one of formation and non-formation of said one type of dots;

(c) enabling the result of multi-valued coding carried out in said step (b) to affect a recording density to be realized by another type of dots having a different hue, carrying out multi-valued coding with respect to said another type of dots according to said recording density, and determining either one of formation and non-formation of said another type of dots; and (d) driving said head based on the results of determination in said step (b) and in said step (c), thereby actually forming said at least two types of dots having different hues.

34. A method of controlling a head, which is able to form at least two types of dots having different hues on an object, and recording a multi-tone image through a distribution of said dots, said method comprising the steps of:

(a) successively inputting multi-color tone signals regarding pixels included in an image to be printed;

(b) carrying out multi-valued coding with respect to one type of dots selected among said at least two types of dots having different hues, based on said input tone signal of a color corresponding to said one type of dots, and determining either one of formation and non-formation of said one type of dots;

(c) calculating a local difference between a first printing density, which corresponds to said input tone signal relating to said one type of dots and regarding a target pixel, and a second printing density, which is realized by said one type of dots in said target pixel, based on the result of multi-valued coding carried out in said step (b);

(d) enabling the local difference to affect a recording density to be realized by another type of dots having a different hue, carrying out multi-valued coding with respect to said another type of dots according to the recording density, and determining either one of formation and non-formation of said another type of dots; and (e) driving said head based on the results of determination in said step (b) and said step (d), thereby actually forming said at least two types of dots having different hues.

35. A method of controlling a head, which is able to form at least two types of chromatic color dots of different hues by at least two chromatic color inks as well as achromatic color dots by an achromatic color ink on an object, and recording a multi-tone image through a distribution of said dots, said method comprising the steps of:

(a) successively inputting tone signals regarding pixels included in an image to be printed;

(b) calculating densities by said at least two chromatic color inks and a density by said achromatic color ink, based on said input tone signals;

(c) carrying out multi-valued coding with respect to said achromatic color ink based on the density by said achromatic color ink calculated in said step (b), and determining either one of formation and non-formation of achromatic color dots by said achromatic color ink;

(d) obtaining correction data, which are to reflect the densities by said at least two chromatic color inks, based on the result of multi-valued coding with respect to said achromatic color ink, and correcting the densities by said at least two chromatic color inks;

(e) carrying out multi-valued coding with respect to said at least two chromatic color dots of different hues, based on said corrected densities by said at least two chromatic color inks, and determining either one of formation and non-formation of said at least two chromatic color dots of different hues; and (f) driving said head based on the results of determination in said step (c) and said step (e), thereby actually forming said at least two chromatic color dots of different hues by said at least two chromatic color inks as well as said achromatic color dots by said achromatic color ink.

36. An image display apparatus for forming at least two types of dots having different hues on an object and expressing a multi-tone image through a distribution of said dots, said image display apparatus comprising:

input means for successively inputting multi-color tone signals regarding pixels included in an image to be displayed;

first dot formation determination means for carrying out multi-valued coding with respect to one type of dots selected among said at least two types of dots having different hues, based on said input tone signal of a color corresponding to said one type of dots, and determining either one of formation and non-formation of said one type of dots;

second dot formation determination means for enabling the result of multi-valued coding carried out by said first dot formation determination means to affect a display density to be realized by another type of dots having a different hue, carrying out multi-valued coding with respect to said another type of dots according to the recording density, and determining either one of formation and non-formation of said another type of dots; and dot formation means for actually forming said at least two types of dots having different hues, based on the results of determination by said first dot formation determination means and said second dot formation determination means.

37. A computer program product configured to store program instructions for execution on a computer system, which is connected to a printing system with a head for forming at least two types of dots having different hues on a printing object and recording a multi-tone image through a distribution of said dots, enabling the computer system to perform the steps of:

successively inputting multi-color tone signals regarding pixels included in an image to be printed;

carrying out multi-valued coding with respect to one type of dots selected among said at least two types of dots having different hues, based on said input tone signal of a color corresponding to said one type of dots, and determining either one of formation and non-formation of said one type of dots;

enabling the result of multi-valued coding with respect to said one type of dots to affect a recording density to be realized by another type of dots having a different hue, carrying out multi-valued coding with respect to said another type of dots according to said recording density, and determining either one of formation and non-formation of said another type of dots; and driving said head based on the results of determination with respect to both said one type of dots and said another type of dots, thereby actually forming said at least two types of dots having different hues.

38. A computer program product configured to store program instructions for execution on a computer system, which is connected to a printing system with a head for forming at least two types of dots having different hues on a printing object and recording a multi-tone image through a distribution of said dots, enabling the computer system to perform the steps of:

successively inputting multi-color tone signals regarding pixels included in an image to be printed;

carrying out multi-valued coding with respect to one type of dots selected among said at least two types of dots having different hues, based on said input tone signal of a color corresponding to said one type of dots, and determining either one of formation and non-formation of said one type of dots;

calculating a local difference between a first printing density, which corresponds to said input tone signal relating to said one type of dots and regarding a target pixel, and a second printing density, which is realized by said one type of dots in said target pixel, based on the result of multi-valued coding with respect to said one type of dots;

enabling the local difference to affect a recording density to be realized by another type of dots having a different hue, carrying out multi-valued coding with respect to said another type of dots according to said recording density, and determining either one of formation and non-formation of said another type of dots; and driving said head based on the results of determination with respect to both said one type of dots and said another type of dots, thereby actually forming said at least two types of dots having different hues.

39. A computer program product configured to store program instructions for execution on a computer system, which is connected to a printing system with a head for forming at least two types of chromatic color dots of different hues by at least two chromatic color inks as well as achromatic color dots by an achromatic color ink on a printing object and recording a multi-tone image through a distribution of said dots, enabling the computer system to perform the steps of:

successively inputting tone signals regarding pixels included in an image to be printed;

calculating densities by said at least two chromatic color inks and a density by said achromatic color ink, based on said input tone signals;

carrying out multi-valued coding with respect to said achromatic color ink based on the calculated density by said achromatic color ink, and determining either one of formation and non-formation of achromatic color dots by said achromatic color ink;

obtaining correction data, which are to reflect the densities by said at least two chromatic color inks, based on the result of multi-valued coding with respect to said achromatic color ink, and correcting the densities by said at least two chromatic color inks;

carrying out multi-valued coding with is respect to said at least two chromatic color dots of different hues, based on the corrected densities by said at least two chromatic color inks, and determining either one of formation and non-formation of said at least two chromatic color dots of different hues; and driving said head based on the results of determination with respect to both said achromatic color dots and said at least two chromatic color dots, thereby actually forming said at least two chromatic color dots of different hues by said at least two chromatic color inks as well as said achromatic color dots by said achromatic color ink.

* * * * *